US010638070B1

(12) United States Patent
McCorkle et al.

(10) Patent No.: US 10,638,070 B1
(45) Date of Patent: *Apr. 28, 2020

(54) SYSTEM FOR AND METHOD OF CONFIGURABLE LINE SCAN ARRAY IMAGING

(71) Applicant: Raytheon Company, Waltham, MA (US)

(72) Inventors: Joseph McCorkle, Waltham, MA (US); Richard A. Zapor, Waltham, MA (US)

(73) Assignee: Raytheon Company, Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/421,887

(22) Filed: May 24, 2019

Related U.S. Application Data

(63) Continuation of application No. 15/482,569, filed on Apr. 7, 2017.

(51) Int. Cl.
*H04N 5/372* (2011.01)
*H04N 5/357* (2011.01)
(Continued)

(52) U.S. Cl.
CPC ........... *H04N 5/357* (2013.01); *H04N 5/3535* (2013.01); *H04N 5/378* (2013.01); *H04N 5/3743* (2013.01); *H04N 5/37206* (2013.01)

(58) Field of Classification Search
CPC ...... H04N 5/357; H04N 5/3535; H04N 5/378; H04N 5/3743; H04N 3/1525; H04N 5/335;
(Continued)

(56) References Cited

U.S. PATENT DOCUMENTS 5,309,230 A * 5/1994 Blondel ................ G01S 3/7864
348/164
7,532,242 B1 * 5/2009 Chen ..................... H01L 27/144
348/295
(Continued)

FOREIGN PATENT DOCUMENTS

WO 2014/102837 A1 7/2014

OTHER PUBLICATIONS

International Search Report and Written Opinion from related PCT Application No. PCT/US2017/065107, dated Feb. 21, 2018.
(Continued)

*Primary Examiner* — Abdelaaziz Tissire
(74) *Attorney, Agent, or Firm* — Burns & Levinson, LLP; Joseph M. Maraia

(57) ABSTRACT

Disclosed are image data acquisition methods and systems that utilizes selective temporal co-adding of detector integration samples to construct improved high-resolution output imagery for arrays with selectable line rates. Configurable TDI arrays are used to construct output imagery of various resolutions dependent upon array commanding, the acquisition geometry, and temporal sampling. The image acquisition techniques may be applied to any optical sensor system and to optical systems with multiple sensors at various relative rotations which enable simultaneous image acquisitions of two or more sensors. Acquired image data may be up-sampled onto a multitude of image grids of various resolution.

17 Claims, 19 Drawing Sheets

(51) Int. Cl.
*H04N 5/378* (2011.01)
*H04N 5/374* (2011.01)
*H04N 5/353* (2011.01)

(58) Field of Classification Search
CPC ...... H04N 3/155; H04N 5/372; H04N 3/1531; H04N 3/1537; H04N 3/1543; H01L 27/148
See application file for complete search history.

(56) References Cited

U.S. PATENT DOCUMENTS

| | | | |
|---|---|---|---|
| 8,558,899 B2 | 10/2013 | Grycewicz | |
| 8,629,387 B2 | 1/2014 | Pflibsen | |
| 9,686,487 B1 | 6/2017 | Fish | |
| 9,876,972 B1 | 1/2018 | Powell | |
| 2010/0046853 A1* | 2/2010 | Goodnough | H04N 5/335 382/275 |
| 2011/0019044 A1 | 1/2011 | Wang | |
| 2011/0115793 A1* | 5/2011 | Grycewicz | G06T 3/4069 345/428 |
| 2011/0293146 A1 | 12/2011 | Grycewicz | |
| 2012/0006971 A1* | 1/2012 | Pflibsen | H01L 27/14634 250/208.1 |
| 2012/0127331 A1 | 5/2012 | Grycewicz | |
| 2014/0085518 A1* | 3/2014 | Fox | H04N 5/3743 348/296 |
| 2014/0368703 A1 | 12/2014 | Yao | |
| 2015/0312493 A1 | 10/2015 | Aldridge | |
| 2018/0295310 A1 | 10/2018 | Zapor | |

OTHER PUBLICATIONS

International Search Report and Written Opinion from related PCT Application No. PCT/US2017/065104, dated Feb. 20, 2018.
Reinhold et al., "Image Super-Resolution for Line Scan Cameras based on a Time Delay Super-Resolution Principle" Proceedings of the 6th International Symposium on Image and Signal Processing and Analysis; 2009; 6 pages.

* cited by examiner

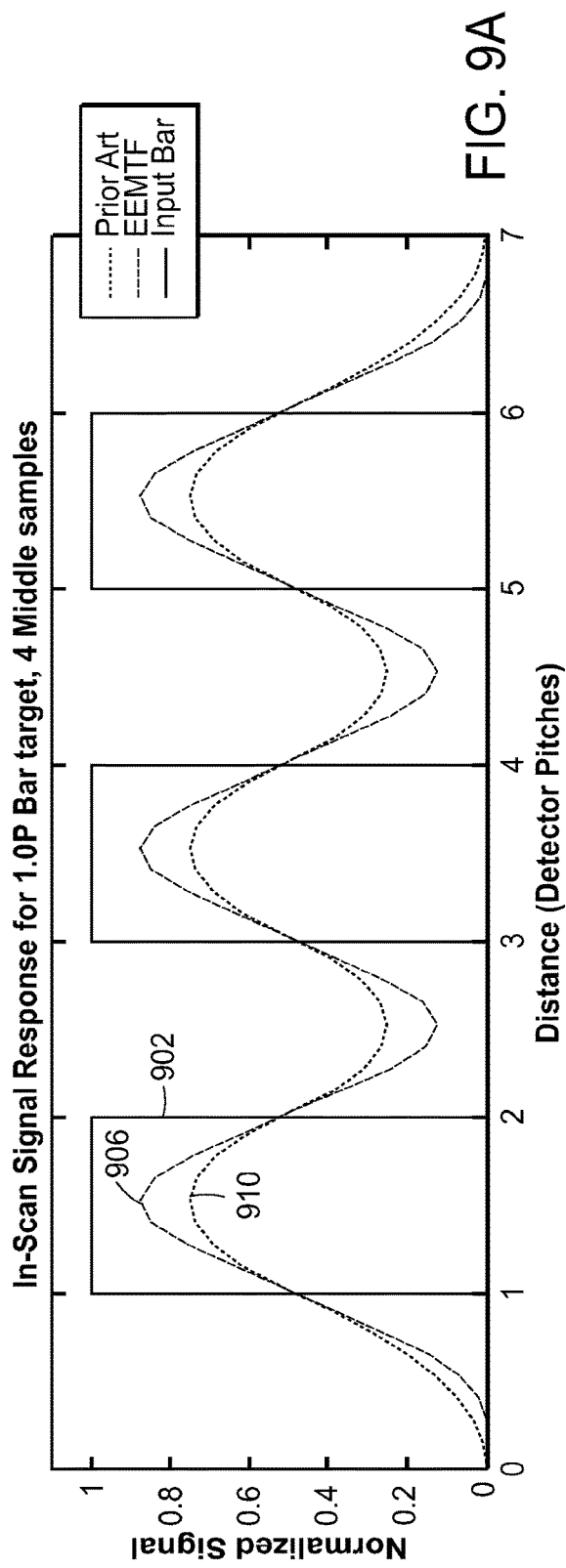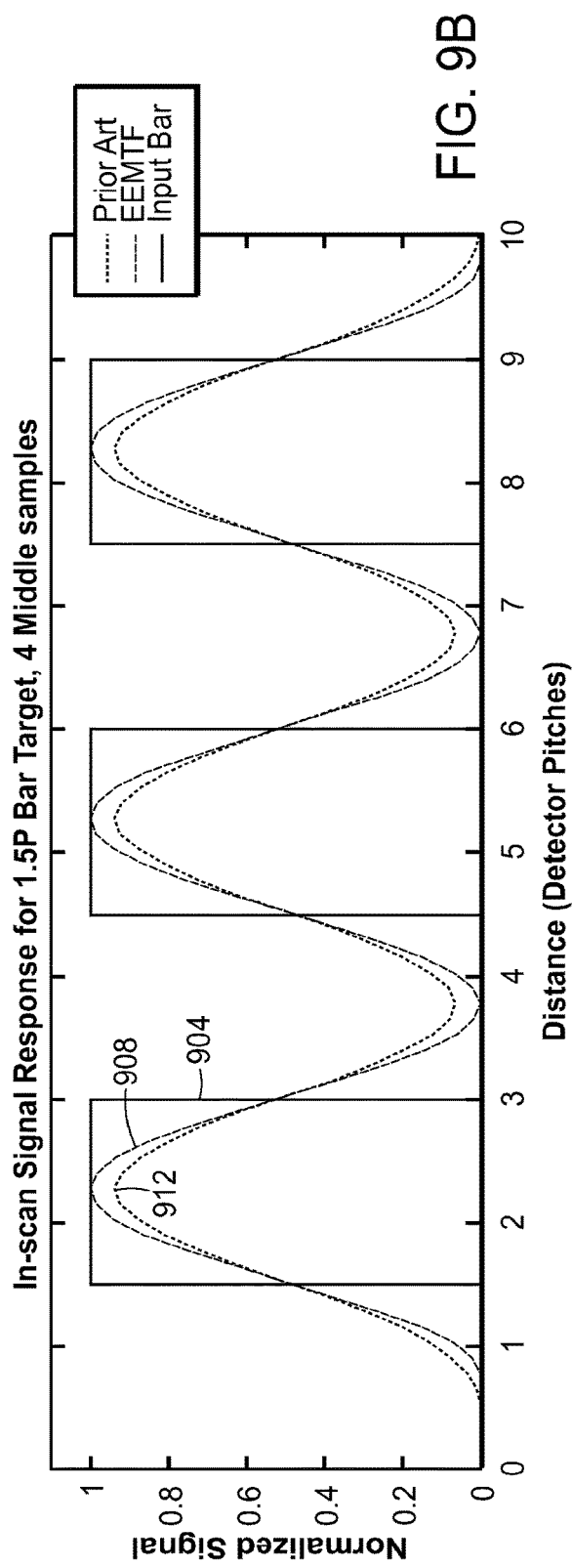

SYSTEM FOR AND METHOD OF CONFIGURABLE LINE SCAN ARRAY IMAGING

RELATED APPLICATION

This application is a continuation application claiming priority from co-pending U.S. patent application Ser. No. 15/482,569, filed Apr. 7, 2017 and entitled "System For And Method Of Configurable Line Scan Array Imaging," the entire contents of which is incorporated by reference herein for all purposes.

BACKGROUND

1. Technical Field

The present disclosure relates generally to image acquisition and, in particular, to systems and methods for constructing enhanced resolution output image using configurable time delay and integrate (TDI) sensor arrays. Embodiments pertain to methods and integrated circuits for optical imaging including read-out integrated circuits (RO-ICs) with TDI capability.

2. Discussion of Related Art

Solid-state detectors such as charge coupled devices (CCD) or CMOS Active Pixel Sensors are widely used in a variety of imaging applications. Typically, the sampling elements (detectors associated with unit cells) are arranged in rows and columns to convert the electromagnetic radiation from a scene into charges that are converted into electrical signals. A linear array consists of only one row of detectors (one dimensional, 1D) while an area array consists of an array of detectors with multiple rows and columns (two dimensional, 2D).

If an imaged scene is moving with respect to the detector and the corresponding movement during the integration period on the detector is considerable with respect to the pixel pitch, the resulting image will be blurred. In many imaging applications, the image scene moves relative to the detector with a constant or predictable velocity. A well-known technique in satellite or aircraft imaging applications is push-broom imaging, wherein a camera images the ground scene. In such applications, a 1D array can be used to generate 2D images by repeatedly exposing and integrating on the single row of pixels while moving the detector in a direction orthogonal to the long dimension of the array. The direction of the motion is called "in-scan", while the direction orthogonal to this motion direction is called "cross-scan".

In line scan applications where the light level is low, or where the relative speed of the movement is large, TDI image sensors comprised of 2D pixel arrays are typically used, wherein the pixel signals delivered by the pixels of the same column are delayed and added synchronously with the optical scanning. Thus, the light from a given point in the scene impinges successively on each pixel of the given corresponding column. As the light of the scene impinges on each row in succession, the signals from each of the rows are added to increase the final SNR. The TDI principle has typically been addressed with CCD sensors, where the TDI functionality is more or less intrinsically available by shifting the charge packets along the CCD synchronously with the moving image. Exemplary array control through commanding is disclosed by U.S. Pat. No. 8,629,387 to Pflibsen et al., entitled "Multi-layer Sensor Chip Assembly and Method for Imaging Generating Image Data with a Frame-Sum Mode and a Time Delay Integration Mode", the contents of which are hereby incorporated by reference.

System sensitivity may be increased by increasing the number of TDI pixels in a scanning focal plane array (FPA), but as the number of TDI detector elements increase, it becomes increasingly difficult to restrict an object in the scene to travel within a single TDI row. Lens barrel distortion and scan geometry are some of the common factors that may move a given scene portion off of a given detector bank, resulting in a blurry picture and relatively little sensitivity improvement from the TDI operation.

In current line scanning arrays, scan smear increases for reduced line rate data acquisition from the FPA's data registers, decreasing the value of the imaging system modulation transfer function (MTF). Improving the image quality resolution and in-scan MTF would, thus, be useful. Reconstruction of a high-resolution image from a sequence of lower resolution images is a way to increase the effective spatial resolution of a camera capturing conventional images. U.S. Pat. No. 8,558,899 to Thomas J. Grycewicz, entitled "System and Method for Super-Resolution Digital Time Delay and Integrate (TDI) Image Processing", which is incorporated by reference in its entirety, discloses processing oversampled imagery to determine scan smear after the imaging system collects the imagery. Another technique is described in U.S. Pat. No. 8,463,078 to Goodnough et al., incorporated by reference herein, wherein images from multiple arrays are processed to improve image quality. "Image Super-Resolution for Line Scan Cameras based on a Time Delay Super-Resolution Principle", Daniel Soukup, A I T, 2009, discloses an impractical asynchronous oversampling of array data, followed by complex processing, in order to improve smear for non-existent array types. While these devices may fulfill their respective, particular objectives, they do not disclose implementations of reduced in-scan smear data generation or improvements based on single image acquisition.

Current data acquisition techniques for TDI arrays are limited to scanning normal to the cross-scan array dimension. To produce a line rate which is less than or equal to the detector's readout rate, a detector is summed multiple times at the array readout rate to yield an accumulated value, as an input to the processing that is in-scan smeared across approximately two projected detector field of view (PD-FOV) areas of the area being imaged. No usable TDI imagery is possible for scan rates greater than the detector's readout rate, or if the scan geometry is not normal to the array's cross-scan axis. In current field offset, non-parallel multi-sensor platforms, only a single sensor's data is acquired per collect, as the other TDI array sensors are limited to orthogonal scanning. Thus, no usable imagery from secondary sensors in their standard operating modes can be obtained. Thus, it would also be useful to be able to configure a TDI array in order to acquire image data for various conditions in order to enable creation of selectable higher resolution imagery, to acquire secondary mission imagery simultaneously with multiple sensors, over larger area collects in reduced time, and for any scan geometry and rate.

SUMMARY

In accordance with an embodiment, a method and system are provided for generating image data for a scene with an imaging device including an array of time delay and integrate (TDI) unit cells each configured to store charge and generate an associated digital value based on photons detected by an associated projected detector, a controller configured to operate in a shift mode, and a digital memory structure having a plurality of storage locations that store one of the digital values and that are individually addressable by the controller. Each of the unit cells is associated with a corresponding one of the storage locations. The controller is configured to select a diagonal scan geometry including a set of the unit cells selected from a single row of the TDI array in an angled orientation relative to changes in relative position between a projected detector field of view (PDFOV) and the scene. During at least one sampling period, the controller scans the diagonal scan geometry in a shift mode where, for each of the unit cells in the diagonal scan geometry, the controller determines a digital value based on stored charge associated with the PDFOV of the scene, adds the determined digital value to the corresponding storage location, shifts stored summed digital values between adjacent corresponding storage locations, and generates image pixels for the scene from the summed digital values of a set of the corresponding storage locations.

The controller may be further configured to operate in an accumulate mode during which, for each of the unit cells in the diagonal scan geometry, the controller determines a digital value based on stored charge associated with the PDFOV, and adds the determined digital value to the corresponding storage location. The diagonal scan geometry may be scanned in the accumulate mode during at least one sampling period when the shift mode is disabled.

In one embodiment, the data shift of the summed digital values is selected to maximize signal range of the TDI array. In certain embodiments, the scan rate is selectable. An image of the scene may be constructed from selected effective resolution pixels by up-sampling of an even or odd multiple of the detector data with the image pixels centered or decentered from the detector data. Sub-regions of the scene image may have distinct effective resolutions. A sub-region of interest may be received as an input selection by the controller where a high resolution grid pixel interpolation is to be performed.

In another embodiment, the controller may form an image of the scene with the image pixels, and format image data of the image into a spatially adjusted data representation based on the scan geometry and sampling rate. The controller may then process the spatially adjusted data representation with a pixel grid to obtain selective resolution image pixels and an associated geometric dataset. At least one of the image and associated scan geometry, or the selective resolution image pixels and associated geometric dataset, may be disseminated to a user, permitting production of dynamic images having user-selectable pixel resolution in one or more image regions of interest.

It is to be understood that the summary, drawings, and detailed description are not restrictive of the scope of the inventive concept described herein.

BRIEF DESCRIPTION OF THE FIGURES

The foregoing and other objects, features and advantages will be apparent from the following, more particular description of the embodiments, as illustrated in the accompanying figures, wherein like reference characters generally refer to identical or structurally and/or functionally similar parts throughout the different views. The figures are not necessarily to scale, emphasis instead being placed upon illustrating the principles of the embodiments, wherein:

FIGS. 9A and 9B are plots of in-scan signal response for four-sample embodiments comparing results from existing approaches and EEMTF methods;

DETAILED DESCRIPTION

Figure 1:
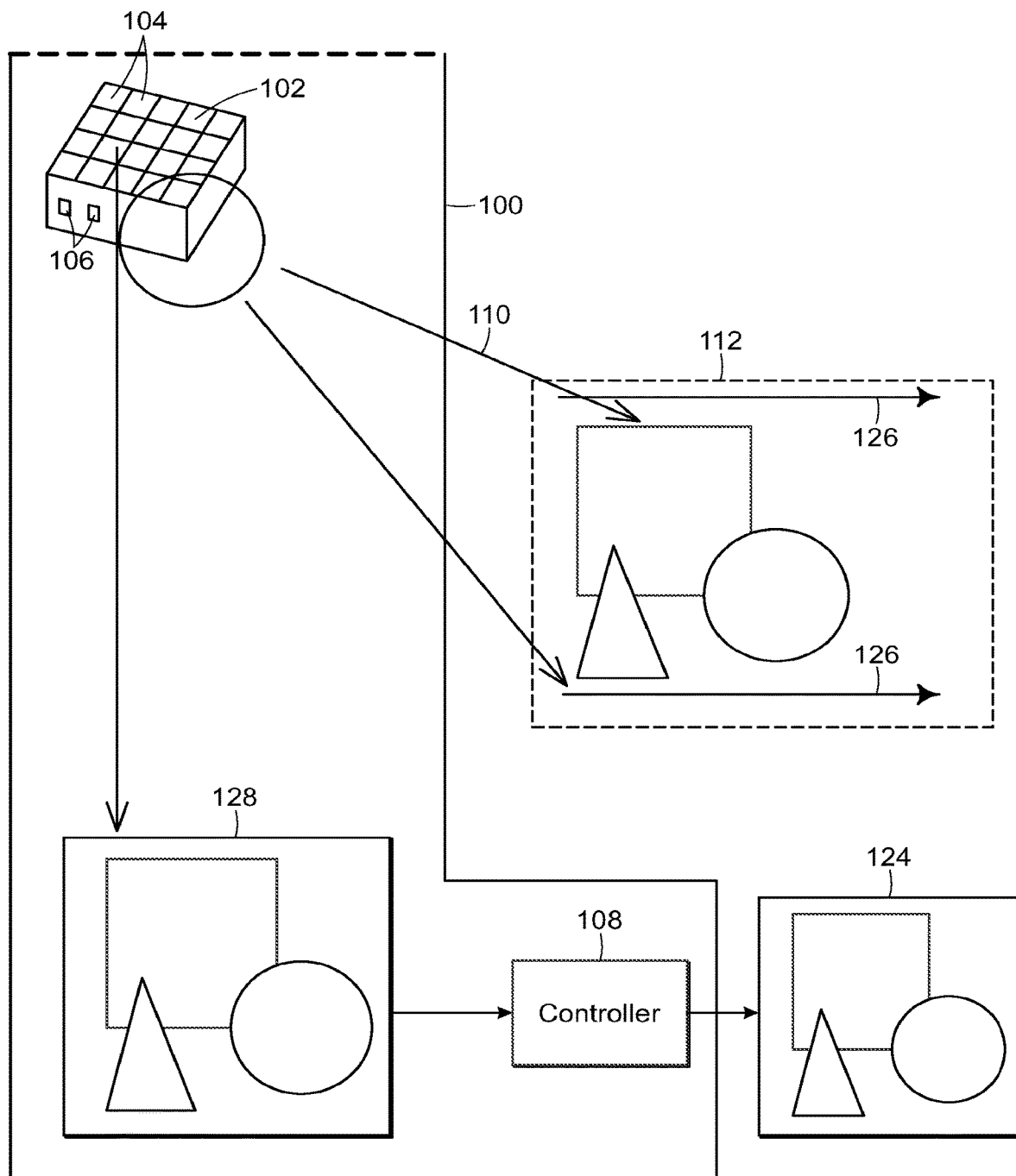
FIG. 1 is a block diagram showing an example embodiment of a digital synthetic super-resolution imager system.

This application is a continuation application claiming priority from co-pending U.S. patent application Ser. No. 15/482,569, filed Apr. 7, 2017 and entitled "System For And Method Of Configurable Line Scan Array Imaging," the entire contents of which is incorporated by reference herein for all purposes.

The following discussion of embodiments of enhanced optical imaging using configurable line scan array imaging methods and systems is merely exemplary in nature, and is in no way intended to limit the disclosed embodiments or their applications or uses. Alternatives to the embodiments disclosed may be devised without departing from the scope of the disclosure. For example, several embodiments are described in terms of sequences of actions to be performed by, for example, by a processor or controller (the terms used interchangeably herein). It will be recognized that various actions described herein can alternatively be performed by specific circuits (e.g., application specific integrated circuits (ASICs)), by program instructions being executed by one or more distributed processors, or by a combination thereof.

Well-known elements of technologies associated with the embodiments will not be described in detail, or will be omitted, so as not to obscure the relevant details of the novel methods and apparatus. The word "exemplary" is used herein to mean "serving as an example, instance, or illustration." Any embodiment described herein as "exemplary" is not necessarily to be construed as preferred or advantageous over other embodiments. Likewise, the term "embodiment" and the descriptive language associated with each use of the term do not require that all embodiments include the discussed feature, limitation, advantage or mode of operation. As used herein, the singular forms "a", "an" and "the" are intended to include the plural forms as well, unless the context clearly indicates otherwise. It will be further understood that the terms "comprises", "comprising", "having", "includes" and/or "including", when used herein, specify the presence of stated features, steps, operations, elements, and/or components, but do not preclude the presence or addition of one or more other features, steps, operations, elements, components, and/or groups thereof. Further, the phrase "based on" is intended to mean "based, at least in part, on" unless explicitly stated otherwise.

As used herein, an "image" may be defined as a display comprising "pixels" defined as image display elements. The terms "sub-region" or "sub-frame", used interchangeably herein, may be defined as one of a set of images that may be used to reconstruct a super-resolution image. A "pixel grid" may be defined as a map of the center of each detector in the imaging device (e.g., focal plane array (FPA)), and an "image grid" may be defined as a two-dimensional projection of these points onto the surface being imaged for a particular sub-region. A "detector" may be defined as an energy gathering element. A "detector array", or "sensor", may be defined as an array consisting of m rows by n columns of detectors. A sensor "field-of-view" (FOV) may be defined as the extent of target region that can be observed by the detector array at one moment. For a TDI array, each of the n columns may have the m rows combined in time to reduce noise. A "projected detector FOV" (PDFOV) may be defined as the target region observed by a single detector at one moment. "Detector data" may be defined as the integrated energy of a detector sensing a PDFOV for a readout-clock time, a summation of multiple detector data samples, or a summation of a set or subset of detector Co-Add data. A "readout-clock time" may be defined as the shortest line output period for the sensor. A "Detector Co-Add data" sample may be defined as the detector data for a single readout-clock time. A "data line" may be defined as detector data for the entire cross-scan extent of a detector array.

Imager System Architecture

Figure 2:
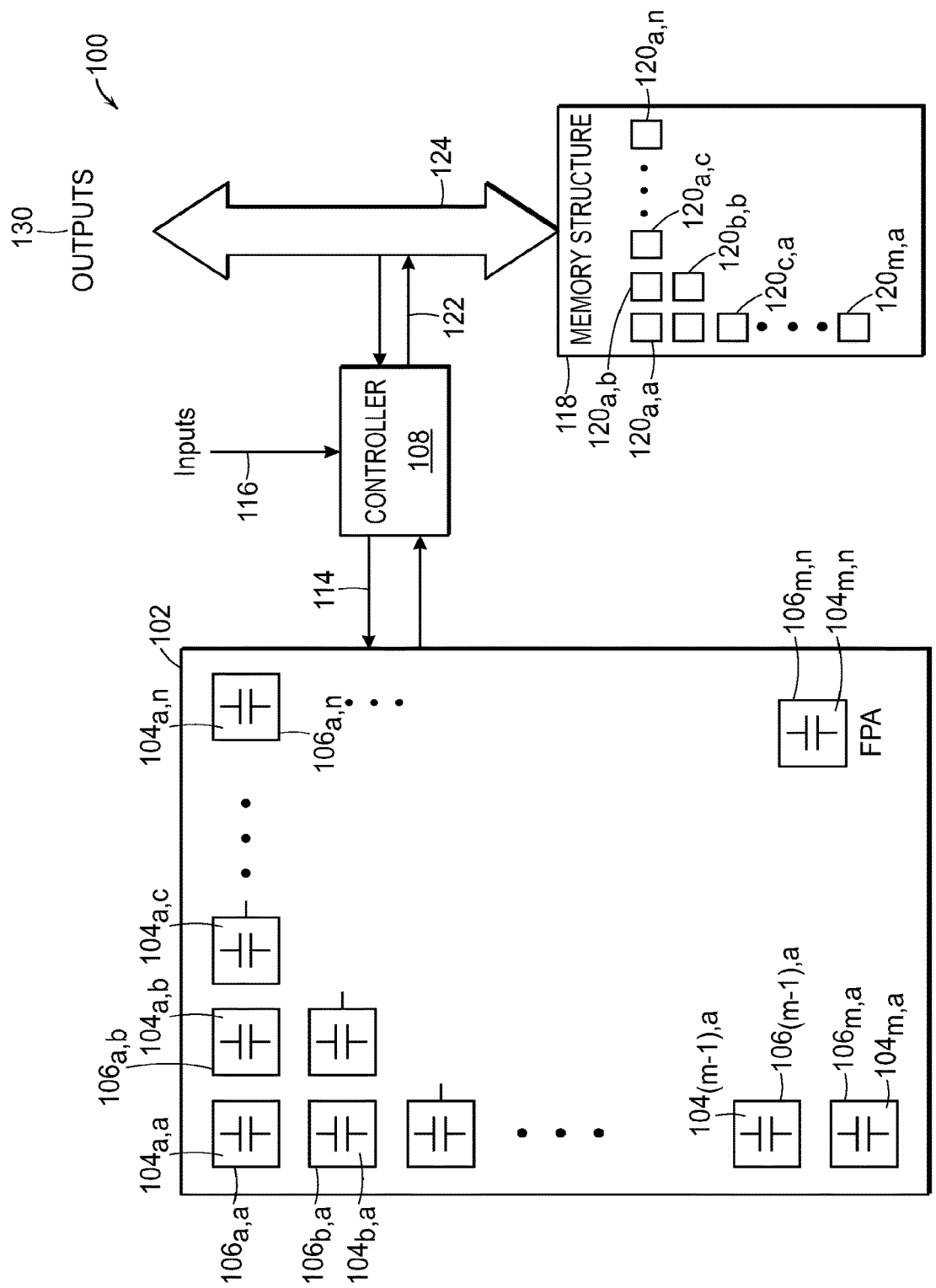
FIG. 2 is a block diagram of an integrated circuit implementation of an imager system with selectable line rate capability, in accordance with some embodiments.

An example embodiment of a TDI imager system 100 for enhanced line scanning imaging is shown in FIGS. 1 and 2. TDI imager system 100 may include a detector array (or sensor) 102 comprised of detectors 104 and associated unit cells 106 that are operatively and independently interconnected to a controller 108 (a processor, or other computing device). In an example embodiment, sensor 102 is responsive to electromagnetic radiation in the visible or infrared region of the spectrum. Sensor 102 may comprise a configurable focal plane array (FPA), and may include charge-coupled devices (CCD), such as are commonly utilized for TDI line-scanners. FPAs are capable of providing high-resolution wide-area coverage and would thereby find application in air and space intelligence, surveillance, and reconnaissance. In such applications, FPAs can reduce the number of assets required for global persistent day/night surveillance and launch detection and fully utilize diffraction-limited resolution.

In an illustrative embodiment, sensor 102 detects incoming optical radiation 110 from a scene 112 using detector photodiodes to create currents that are proportional to the optical radiation 110. That is, each detector 104 in the detector array 102 produces a current that is proportional to the photon flux impinging upon the detector 104. Each detector 104 is associated with one of the unit cells 106. The controller 108 may issue commands 114 that determine from which of the detectors 104 current is collected and stored as charge in the associated unit cells 106, where electronics integrate the charges and produce, via analog to digital converters (ADCs), digital numbers (DN) proportional to the total charge accumulated over the frame period.

In an example embodiment, sensor 102 may comprise a TDI imager with the TDI imaging geometry optimized as an input 116 to controller 108 programmed to perform super-resolution image reconstruction processing. Controller 108 may also be programmed to implement processing tasks including, but not limited to, re-sampling as described herein. Controller 108 may have access to a digital memory structure 118 having a plurality of data storage locations $120_{a,a}$-$120_{m,n}$ (e.g., data registers) individually addressable by the controller 108 and each corresponding to one of the unit cells 106. Controller 108 may be implemented in a variety of ways and may take the form of a single-chip microcontroller, a mainframe computer, or anything in between. Controller 108 may through commands 122 be configured to initiate the transfer of output imagery data 124 from certain storage locations 120 and to control shift and accumulate modes for operating sensor 102, up/down counting, scan and line rate timing, and integration times. Controller 108 may also perform on-chip digital signal processing functions, such as the image enhancement processes described below. Commanding functions may be predetermined for autonomous operation, or may comprise external control signals received within the input 116. It should also be appreciated that the processing functionality provided by the controller 108 can be distributed among multiple computing devices and/or provided at least in part via a remote communications link.

Scene 112 is shown in motion (indicated by arrows 126) relative to detector array 102. In an example embodiment, detector array 102 is mounted such that the rows of detectors 104 in the array form an angle parallel or perpendicular to the direction of scene motion. In this way, each detector 104 in the detector column is presented sequentially with a particular portion of the scene 112. The photo-charge accumulated in each successive detector 104 during the time that the portion of the scene 112 moves over the detector 104 contributes to the respective pixel in the captured image. Whereas in a conventional TDI imager, camera timing would be synchronized such that the scene 112 moves by exactly one pixel/detector per frame, in an example embodiment of the TDI imager system 100 described herein, scan timing is set such that the scene 112 traverses a fractional portion of a DPFOV or an integral number of DPFOVs between image lines. In an example embodiment, controller 108 is programmed to process image 128 by compensating for the image motion and summing on a high-resolution image data grid as described herein. The resulting output imagery data 124 will have higher spatial resolution than previously attained with current state of the art methods, and (depending on system parameters) may also have better amplitude-resolution and signal-to-noise ratio (SNR).

With reference again to FIG. 2, TDI imager system 100 may be configured to operate as a readout integrated circuit with multi-accumulate-sample selectable line rate capability by usage of the accumulate and shift modes. When operating in accumulate mode, controller 108 is configured to read a value based on the stored charge from at least some of the unit cells 106a,a-106m,n. The accumulating storage locations 120a,a-120m,n may each corresponds to a distinct one of the unit cells 106a,a-106m,n. For example, storage location 120a,a may correspond to unit cell 106a,a, storage location 120a,b may correspond to unit cell 106a,b, storage location 120m,a may correspond to unit cell 106m,a, and so on. When operating in accumulate mode, controller 108 may be configured to read and add a digital value (Co-Add data) based on the stored charge from unit cell 106a,a to the existing value in storage location 120a,a, add the value based on the stored charge from unit cell 106a,b to the existing value in storage location 120a,b, and so on. When operating in shift mode, controller 108 may shift the storage location for the Co-Added data digital values by one or more storage location positions prior to adding, and add the read the digital value to a shifted storage location. For example, when the shift is equal to one pixel in the horizontal direction, the controller 108 may add the value based on the stored charge from unit cell 106a,a to the existing value in storage location 120a,b after shifting existing stored Co-Add data from storage location 120a,a to storage location 120a,b, and so on. In these embodiments, the location that the Co-Add data is stored in may be shifted along rows and/or columns of sensor 102 by a whole number of pixels that is less than the m×n array size. A data output 130 may be loaded from storage location 120m,a that corresponds to unit cell 106m,a and which contains Co-Add data that has been shifted over by one or more corresponding pixels/detector areas in detector array 102.

Controller 108 may be configured to read a digital value based on the stored charge on less than all of the unit cells 106 during a particular sampling time. As scene 112 sweeps across the detector array 102, the data-shifting mechanism of the unit cells 106 may be employed to move digital values simultaneously with the movement of the scene. As Co-Add digital data moves from an initial storage location 120a,a to a readout storage location 120a,n, it may or may not accumulate additional Co-Add data along the way. When the readout storage location 120a,n is reached, the data output 130 may be read out of the sensor 102.

In some embodiments, one or more input control signal(s) 116 may select some or all of the operational configuration parameters to be implemented. For example, control signal 116 may indicate to controller 108 whether to operate in accumulate or shift mode, which detectors 104 and unit cells 106 may be active in accumulate mode, and/or the integration time to allow each unit cell 106 to accumulate incident scene photon signals. The control signal 116 may also indicate the number of unit cells 106 to accumulate in accumulate mode, the number and addresses of storage locations 120 to shift in shift mode, the line rate, and/or the scan rate. The control signal(s) 116 may be operator selected, or may be provided by external sensing or computing devices. In some embodiments, the number of pixel positions to shift the storage locations 120 in shift mode may be determined based on the rate at which an observed scene object is moving within the FOV of the array sensor 102.

Evolved Enhanced MTF (EEMTF)

Figure 3:
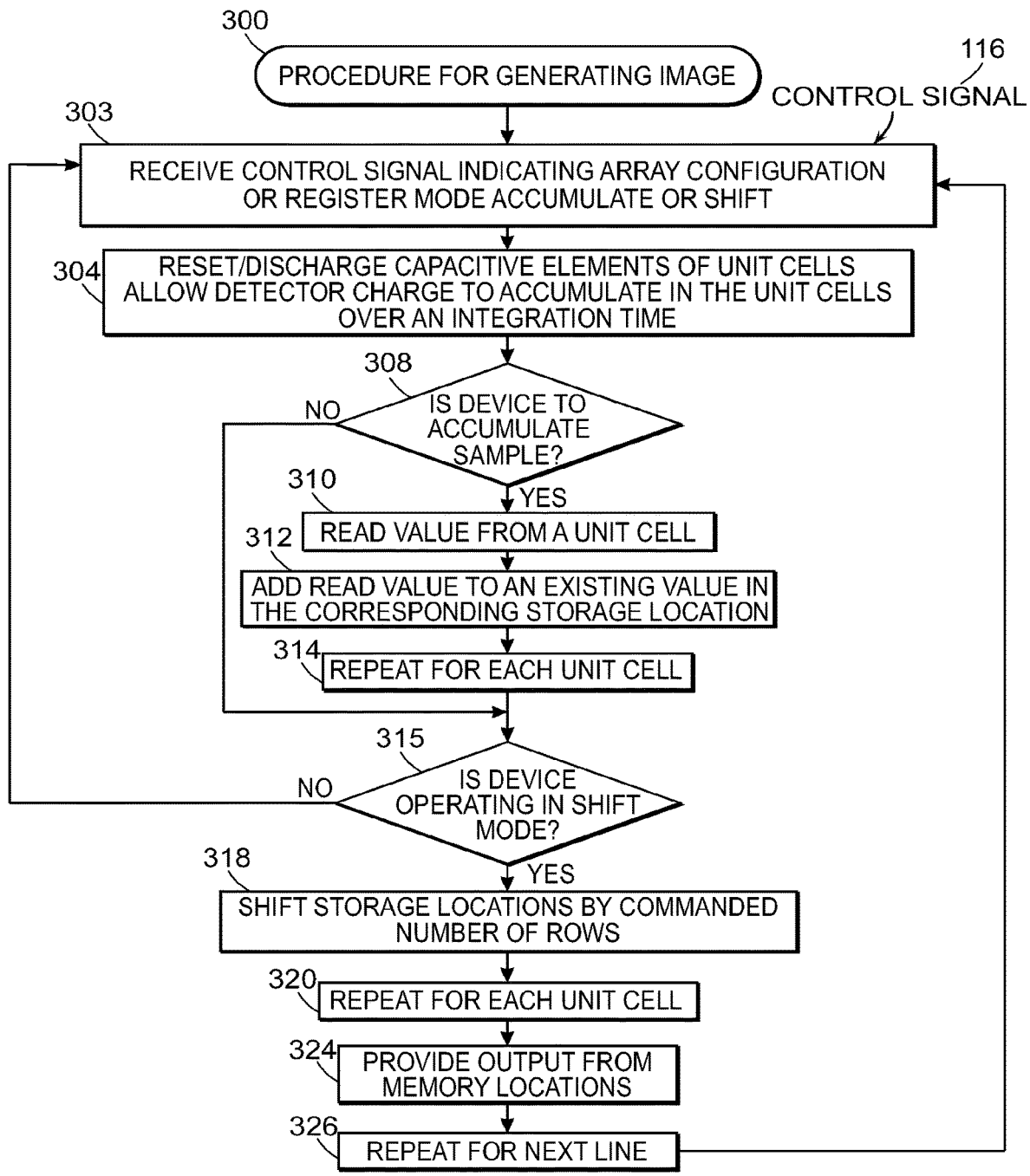
FIG. 3 is a flow diagram of a method for generating image data, in accordance with some embodiments.

FIG. 3 is a flow diagram illustrating an EEMTF method 300 for generating reduced scan smear line scan image data utilizing modified commanding as described above, in accordance with some embodiments. Method 300 may be performed by TDI imager system 100 operating in accumulate or shift modes.

In step 303, controller 108 may receive control signal 116 indicating a configuration for the detector array 102, and when to operate in accumulate mode or shift mode, wherein enablement of each mode corresponds to certain readout-clock times. When indicating to operate in shift mode, the control signal 116 may also indicate the number of storage locations 120 to shift.

In step 304, the storage locations 120 of the digital memory structure 118 may be cleared and capacitive elements of the unit cells 106 may be discharged (e.g., reset) and charge may be allowed to accumulate on the capacitive elements of the unit cells 106 over an integration time determined by controller 108.

In step 308, a determination is made by controller 108 whether accumulate mode is the current operational state for the imager system 100. If so, controller 108 iteratively accumulates for a specified integration time Co-Add data, for each read-out clock time while in accumulate mode, and for each of a set of the unit cells 106 specified by controller 108, where each selected unit cell 106 has a PDFOV of the scene 112. In step 310, the digital (Co-Add) value is read from a unit cell 106 and is added in step 312 to the existing Co-Add data in the storage location 120 corresponding to the unit cell 106. Steps 310 and 312 are repeated (step 314) for at least some of the other unit cells 106.

If, in step 308, the accumulate mode is determined to be disabled, logical operation passes to step 315, where a determination is made by controller 108 whether imager device 100 is to be operated in shift mode. If shift mode is determined not to be enabled, controller 108 returns processing to step 303 to execute additional signal accumulation. If shift mode is enabled, controller 108 iteratively performs steps 318-320 for each selected unit cell 106 until the shift mode is no longer enabled.

In step 318, the Co-Add data stored in the corresponding storage location 120 (e.g., data register) is shifted by the number of rows based on the rate of motion of the scene 112 in relation to the PDFOV (which may be specified by controller 108), in accordance with shift mode as discussed above. Step 320 causes step 318 to be repeated for a plurality of the storage locations.

In step 324, the added Co-Add data from at least some of the storage locations 120 are output as imaging data. The outputs may correspond to one line of data. At step 326, the EEMTF method 300 is repeated for the next line of detectors.

As previously noted, line scanning detectors are continuously moved (or the imaged object or scene 112 is moved across the sensor 102) and are conventionally sampled at a single high speed readout rate. The over-sampled detectors 104 integrate energy while moving, and the mismatch between the line scan rate and the readout rate may result in scan smear. Integration fraction may be defined as the time that a projected detector (e.g., detector 104a,a) is integrating energy versus the time between data collects from an associated storage location 120a,a, the latter time being time during which data is being transferred and preparation for the next data collect occurs. During each integration period, the projected detector is moving relative to scene 112, so a PDFOV of the scene 112 greater than the area of the projected detector is integrated to form a single pixel of image 128 of the scene 112. The amount of blurring introduced by scanning is dependent on the integration fraction, where a smaller integration fraction causes less blurring, but also results in less acquired signal.

Figure 4:
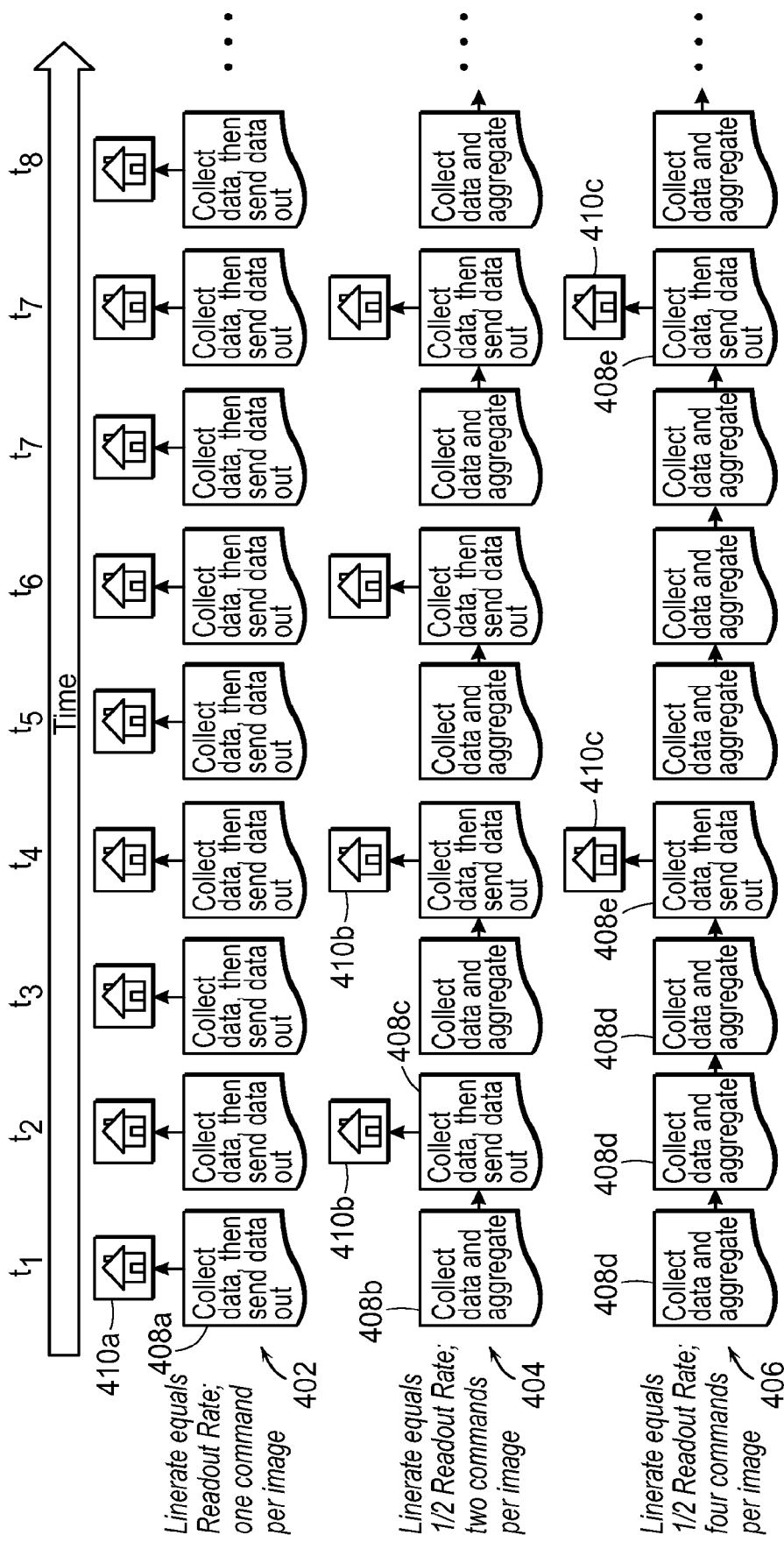
FIG. 4 is an illustration of modified commanding to produce slower line rates in an imager system.

FIG. 4 illustrates with three exemplary scenarios 402, 404, 406 (for a single detector) for aid in visualizing how slower line (output) rates may be achieved. Commands 408 are sent to the TDI detector array 102 at a constant readout rate that is independent of the line rate. The readout rate defines the maximum line rate of the detector(s) 104. Slower line rates may be achieved by temporally co-adding (or aggregating), in an accumulate mode (steps 310, 312, 314 described above above), charge integrations of the detector(s) 104. For example, scenario 402 shows the typical operation of conventional scanning detector arrays, where the line rate equals the readout rate and one command 408a to collect data and send image data 410a out is sent to each detector(s) 104. In scenario 404, the line rate equals one-half the readout rate, i.e., image data 410b is sent out from the detector(s) 104 on every other readout clock time (shown at times t2, t4, etc.). Commands 408b includes instruction to aggregate data, but not to send data out from the detector, while commands 408c additionally instruct that image data 410b be sent out. Scenario 406 presents the case wherein the line rate equals one-quarter the readout rate, achieved by three accumulate mode commands 408d data aggregations between each image data 410c readout data command 408e (at times t4, t8, etc.). The integration fraction may be selected such that a detector 104 does not collect information for integration and addition to an accumulator for the entire time of a readout clock time interval (e.g., t1 to t2). For example, if the integration fraction is 75% and the line rate equals ¼ of the readout rate, during each time interval, the center of the detector 104 moves a distance equal to ¼ of the detector area and is collecting information for 75% of this time. For three readout clock times, the collected information is integrated and added to an associated storage location 120. On every fourth readout clock time, data is selectively aggregated, and then the readout storage location 120 sends out a single image data point.

Figure 5:
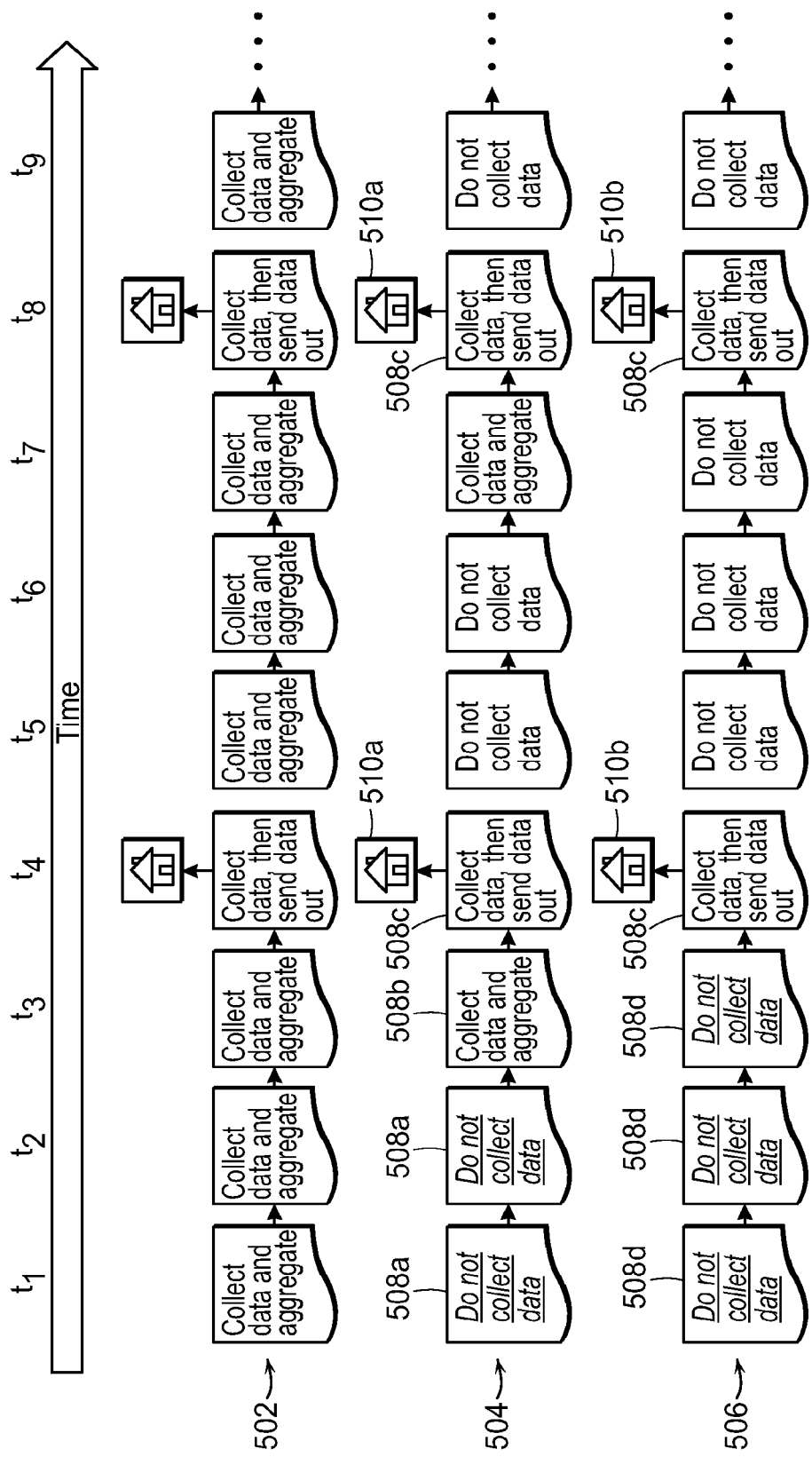
FIG. 5 is an illustration of modified commanding to reduce Co-Add data sample collection in an imager system.

With reference to FIG. 5, scan smear may be reduced through variable temporal co-adding (accumulation), i.e., through selective over-sampled detector integration. Through modified detector commanding, the number of detector integrations co-added may be selectively reduced to produce each set of image data. Scenario 502 shows the conventional process wherein the line-rate equals ¼ of the readout rate, and data is being collected and aggregated on each readout clock time. An effect of utilizing every data sample available is larger effective pixels for lower line rates. Scenarios 504 and 506 show alternative methods wherein commands 508a and 508d instruct the detector(s) 104 to not collect Co-Add image data. Command 508b comprises a collect data and aggregate command, and commands 508c comprise data collect and send commands. By temporally co-adding fewer detector integrations (with or without a reduced integration fraction) to produce each image data point 510a, 510b, less of the scene 112 is imaged, thereby reducing the image scan smear by sampling less of the scene 112. While this results in a decreased number of scene photons being collected, the lost photons are from an undesired (blur causing) part of the scene 112 for the current pixel being formed. So, while the image pixels for larger co-adding (larger blur) are formed from more photons, they do not represent the true scene as accurately as the low scan smear data scenario.

Figure 6:
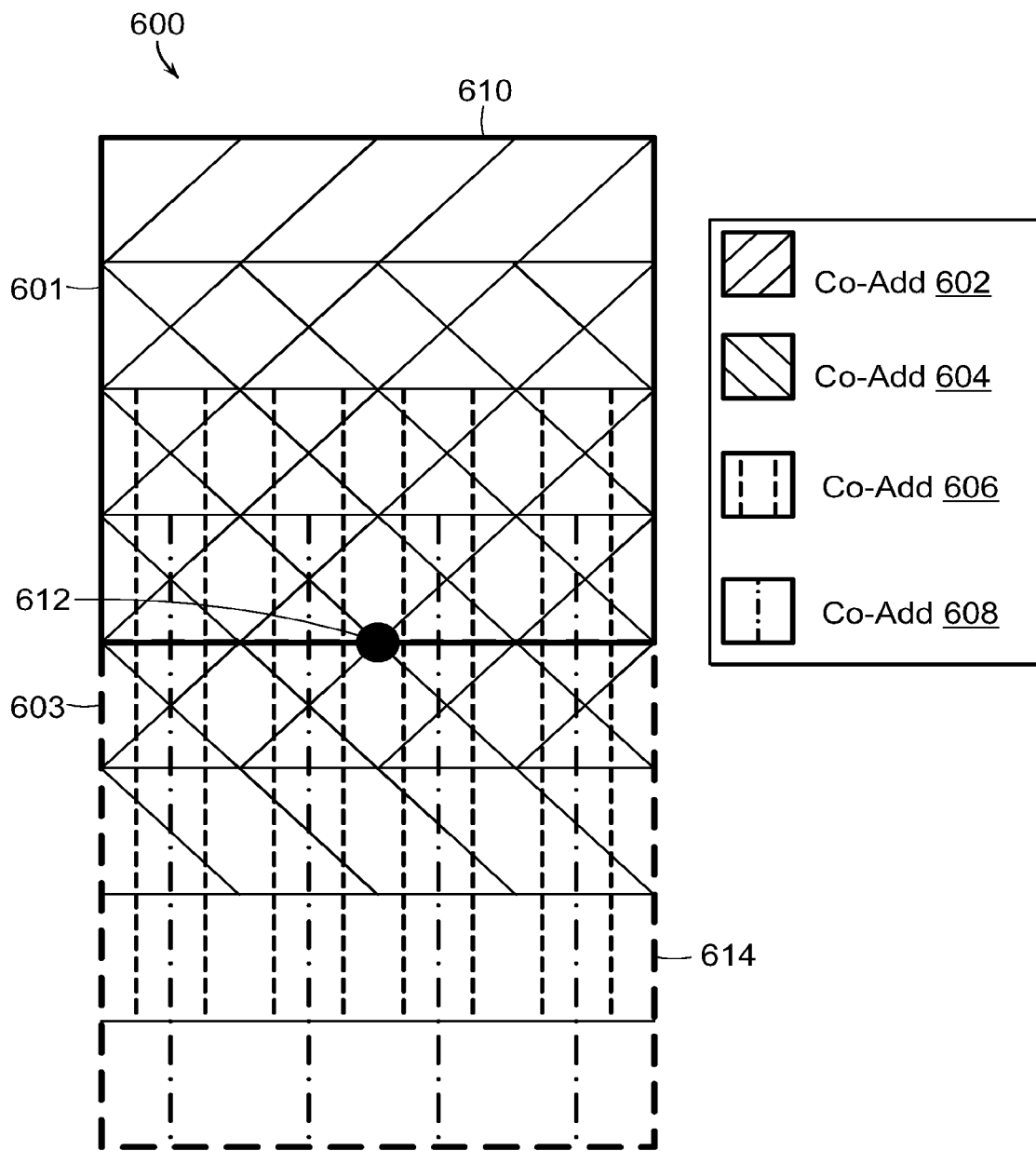
FIG. 6 is an illustration of an example projected detector field of view (PDFOV) four Co-Add data sampling integration, in accordance with some embodiments.

FIG. 6 depicts a portion 600 (i.e., two adjacent detectors 601, 603) of detector array 102 during exemplary detector integration stages over time, utilizing four energy accumulation regions 602, 604, 606, 608 and an integration fraction of 100%. Co-Add region 602 extends for 25% longer than the in-scan height of the detector PDFOV 610. Co-Add regions 604, 606, 608 accumulate energy in subsequent sampling periods shifted by a ¼ PDFOV each time. The total area contributing energy to the accumulation includes the initial PDFOV 610 through a quadrature extended PDFOV region 614 combined. A four Co-Add energy accumulation centroid is depicted as detector-data-centroid 612. The resultant detector-data-centroid 612 is based upon energy inclusive of two PDFOVs, which results in an in-scan smear component of one PDFOV.

Figure 7:
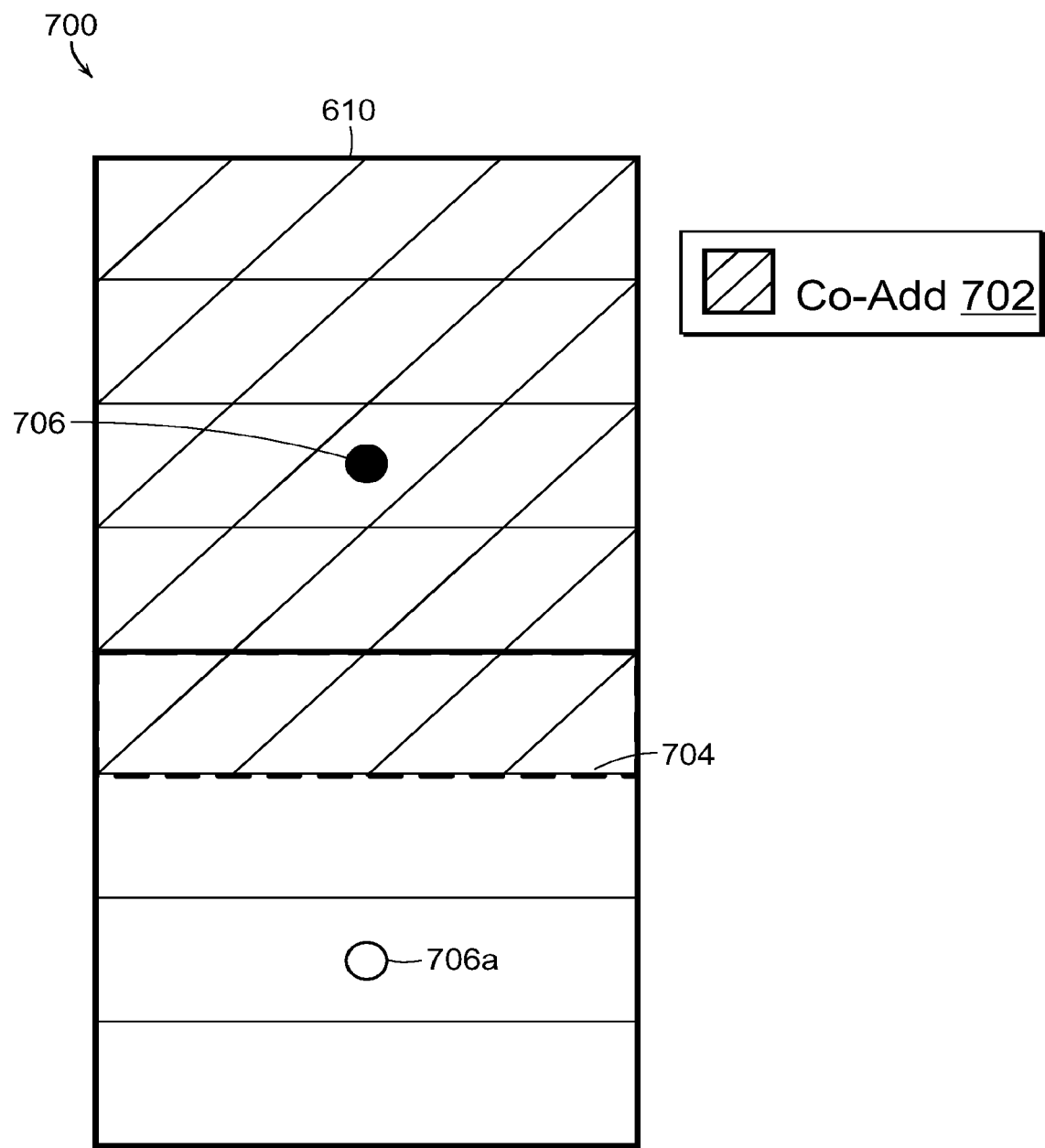
FIG. 7 is an illustration of an example PDFOV single Co-Add data sampling integration, in accordance with some embodiments.

FIG. 7 depicts an example embodiment where a single Co-Add accumulation PDFOV 700 of PDFOV 610 is shown for a single Co-Add energy accumulation region set with an integration fraction of 100%. The Co-Add region 702 extends for 25% longer than the in-scan height of PDFOV 610. The total area contributing energy to the accumulation includes initial PDFOV 610 through a single extended PDFOV region 704. The resultant centroid of a single Co-Add energy accumulation is depicted by detector-data-centroid 706. The resultant detector-data-centroid 706 is based upon energy inclusive of a 1.25 PDFOVs, which results in an in-scan smear component of ¼ PDFOV. The adjacent in-scan detector produces a detector-data-centroid 706a that is one PDFOV in-scan offset.

Figure 8:
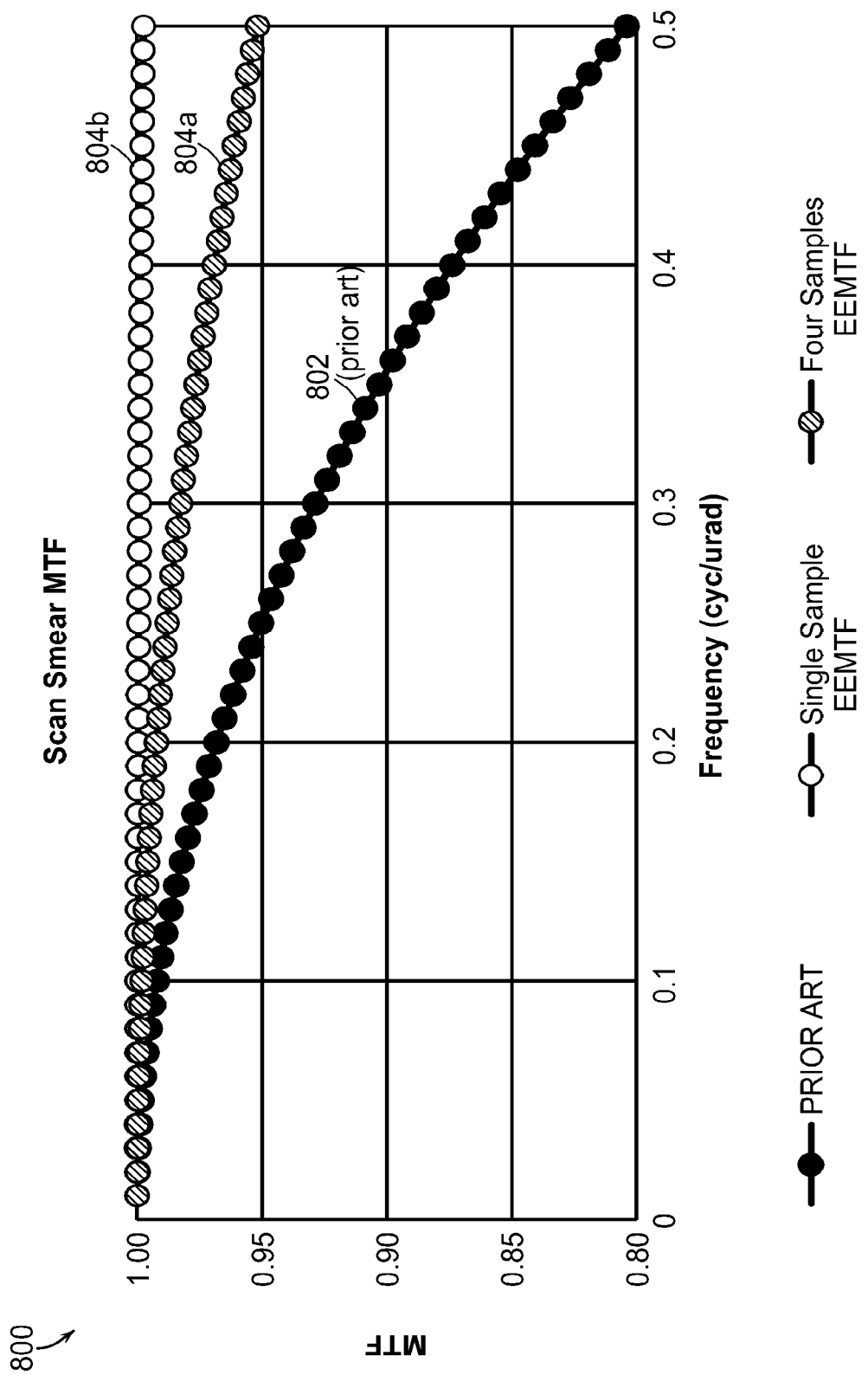
FIG. 8 is a plot of scan smear MTF for an existing line scan method and for two embodiments of the EEMTF method described herein.

FIG. 8 is a plot 800 demonstrating an improvement in scan smear MTF achieved in an example imager system 100 practicing the EEMTF scan smear reduction techniques described herein, as a function of line scanning frequency. In this example, the line rate (1000 lines/sec) was equal to ⅛ of the readout rate (125 lines/sec), and an integration fraction of 0.88 was utilized. A greater improvement in MTF (i.e., difference between curve 802 resulting from an existing TDI line scan method and curves 804a and 804b reflecting four Co-Add and single Co-Add embodiments of the EEMTF method 300, respectively) can be seen at higher frequencies. More specifically, a 14.8% MTF enhancement at Nyquist sampling rate for the four sample embodiment (i.e., accumulating only four middle samples of a line scan), and a 19.4% MTF enhancement for the single sample EEMTF embodiment, were demonstrated.

Analyses have shown that a scan smear reduction of greater than 20% may be achieved in certain scenarios, and that the MTF may be maximally improved at the most difficult to achieve imaging scenarios.

FIGS. 9A and 9B are plot of experimental results, comparing scan smear resulting from an existing TDI line scan method and from four Co-Add embodiments of the EEMTF method 300. FIG. 9A reflects results from imaging a detector pitch (P) of 1.0 bar target 902, and FIG. 9B a 1.5 P bar target 904. In each case, reduced scan smear is evident in the plotted curves 906, 908 resulting from the EEMTF method, compared to the plotted curves 910, 912 resulting from the existing TDI line scan method. The conventional approach results in a smear of 1.985 pixels, whereas the four sub-sample EEMTF approach results in a 1.485 pixel smear and the single sub-sample approach results in a 1.110 pixel smear.

In some embodiments, after a region of a scene 112 is scanned by adjacent TDI detector lines, the image data from each of those TDI lines may be subjected to a range of image processing techniques. Matching reference frames and adding the image data from the TDI lines may achieve a higher resolution image. The co-add scene data may also require digital scaling (e.g., in step 324 of FIG. 3) in order to maximize the signal range of the imager device, i.e., to provide a maximally used output digital word. An enhanced resolution output image may also be constructed using techniques that will now be described.

Diagonal Imagery Collection Enhancement (DICE)

Figure 10:
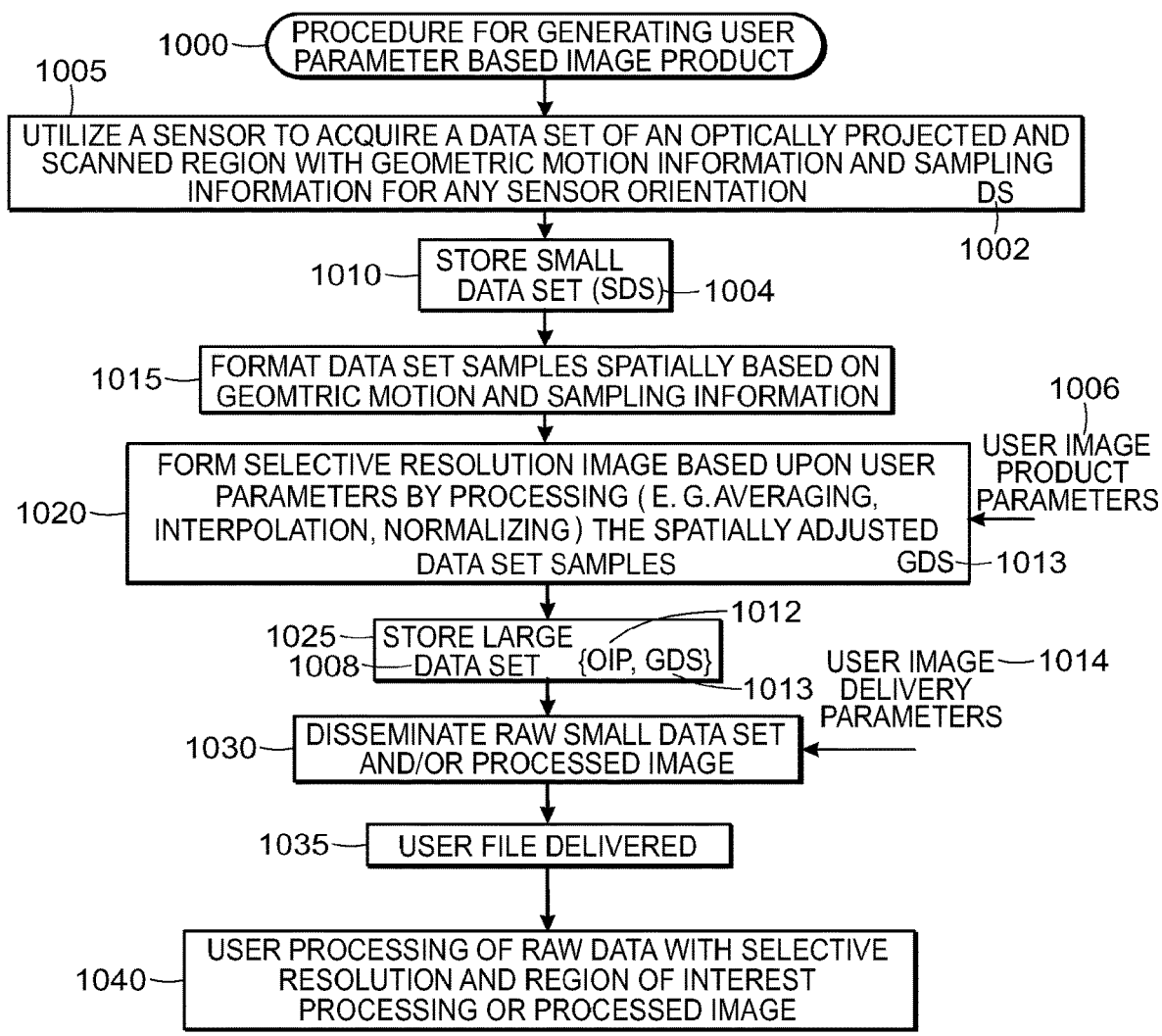
FIG. 10 is a flow diagram of a method for processing a data set inclusive of archival, image generation, dissemination options, remote image generation, and remote image re-processing for enhanced resolution image data, in accordance with some embodiments.

FIG. 10 is a flow diagram of a DICE method 1000 for constructing an image utilizing a TDI detector array 102 for any scan geometry and any scan rate, and for processing the collected image data to produce re-sampled imagery at various selectable effective resolutions. Embodiments of the DICE method 1000 permit the creation of images with the various resolutions that are enhanced for over-sampled data sets and reduced for under-sampled data sets, while enabling image creation during alternate imaging. A selective oversampled detector integration scan smear reduction capability somewhat similar to that described above may be employed in the DICE method 1000, but only optionally employing the selective Co-Add capability of the imager system 100, and alternatively cross-scan oversampling with a diagonal system scan and optionally an enhanced image product application employing up-sampling interpolation. An innovative feature utilized in the DICE method 1000 is configurability of the TDI detector array 102 to reduce the array to a single row, in order to enable usage of subset temporal data collection from the over-sampled detectors in the diagonal scan mode to achieve a maximally sampled data set with virtually no diagonal scan smear.

Referring again to FIG. 1, a scene 112 (denoted in dashed lines) to be imaged is shown in motion relative to TDI imager system 100. In an example embodiment, imaging system 100 is mounted such that the rows in the detector array 102 form an angle to the direction of relative motion with respect to the scene 112. Whereas in a conventional TDI imager the camera would use all detector rows, in an example embodiment of the DICE configurable TDI imager, only a single row of detectors acquires scene signal. Whereas in a conventional TDI imager the camera timing would be synchronized such that the image moves by exactly one pixel per frame, in an example embodiment of the DICE configurable TDI imager, the timing is set such that the scene 112 traverses any portion of a DPFOV between image lines. In DICE methods 1000, controller 108 may be programmed to compensate for the relative motion and summing on a high-resolution image grid as described below. Resulting output image data 130 will have higher spatial resolution than previously attained with current state of the art methods, may (depending on system parameters) also have better amplitude-resolution and signal-to-noise ratio (SNR), and may provide expanded area coverage for a number of lines at lower resolution.

Figure 11A:
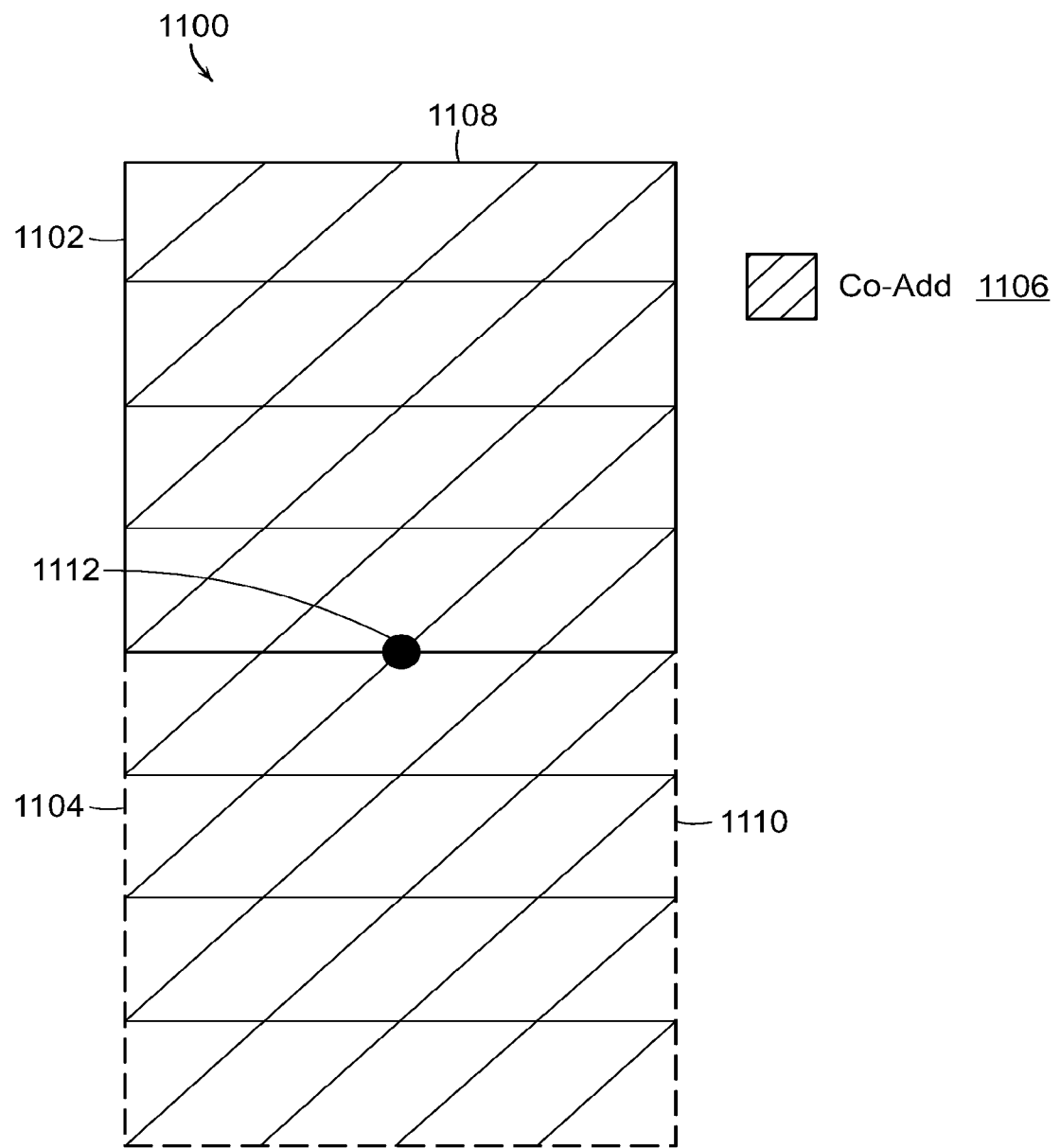
FIG. 11A is an illustration of an example PDFOV single Co-Add data sampling integration.

FIG. 11A depicts a portion 1100 (i.e., two adjacent pixel areas 1102, 1104) of detector array 102 during exemplary detector integration stages over time in an embodiment of a DICE method 1000. The depicted embodiment employs a single Co-Add energy accumulation region 1106 set with an integration fraction of 100%. Co-Add region 1106 extends for the in-scan height of PDFOV 1108. The total area contributing energy to the accumulation includes initial PDFOV 1108 through a single extended PDFOV region 1110. The resultant centroid of a single Co-Add energy accumulation is depicted by detector-data-centroid 1112. The resultant detector-data-centroid 1112 is based upon energy inclusive of two PDFOVs, which results in an in-scan smear component of one PDFOV.

With reference again to FIG. 10, DICE method 1000 may be performed by a combination of elements, such as controller 108 and other previously described components of imager system 100 (e.g., as shown in FIG. 2). DICE method 1000 may be performed for generating image data for scene 112 in a combined sequence of optional accumulate modes and shift modes, each similar to the accumulate and shift modes described above.

In step 1005, an image data set 1002 is acquired in a manner similar to the method shown in FIG. 3, but alternatively utilizing diagonal scanning, with the scan geometry and optionally the scan rate being externally controlled and the scan geometry reduced to a single row of detectors 104 and associated unit cells 106 of the sensor array 102 in an angled orientation relative to changes in relative position between a PDFOV of each selected detector 104 and the scene 112. Use of the accumulate mode is also optional, in comparison to the method shown in FIG. 3.

In step 1010, a combination of the image data set 1002 acquired in step 1005 and the associated scan geometry utilized to acquire the image data set 1002 is stored as one or more small data set(s) 1004.

In step 1015, image data samples of the small data set(s) 1004 are formatted spatially into a spatially representative format, based on geometric motion and sampling rate information contained in the scan geometry, for subsequent processing.

In step 1020, controller 108 receives (e.g., from an external source such as a user) image product parameters 1006 and one or more of the small data sets 1004. Controller 108 may then create (step 1020) and store (step 1025) a large data set 1008 comprised of an output image product 1012 in pixels and a geometric data set 1013 The output image product 1012 may contain sub-regions of interest having selective higher resolution based on the received product parameters 1006. The sub-regions of interest may be generated by processing (e.g., averaging, interpolating, normalizing, etc.) the spatially adjusted data set samples of the small data set(s) 1004 associated with the sub-regions, as identified by the user image product parameters 1006. For example, data set samples of the output image product 1012 may be interpolated based on neighboring pixel image data sample values, a process known as resampling. The interpolation may be used to achieve "super resolution", wherein the effective resolution of an image or a sub-region of an image may be increased. In some embodiments, super resolution is enabled by representing the spatially representative format of the output image product 1012 at a higher sample density than the original sample density (up-sampling). A high-resolution image grid may be constructed on which to collect the data set samples of the output image product 1012. The high-resolution image grid may be stored in computer memory (e.g., in a memory device included in and/or accessible to the controller 108). Pixels of the data set samples are assigned to pixels in the high-resolution pixel grid where the center of the high-resolution pixel most closely represents the same image location as the center of the data set sample pixels. When a subsequently generated output image maps to the same pixels as an earlier output image, the high-resolution values may be summed (increasing amplitude resolution), or the earlier value may simply be replaced. If multiple values are summed, and when the number of values summed at all pixels may not be the same, the controller may keep track of the number of summed values so that the final pixel values can be normalized.

In step 1030, controller 108 may receive user image delivery parameters 1014 that inform controller 108 whether the small data set(s) 1002 and/or the large data set(s) 1008 are to be disseminated to one or more user(s). In step 1035, controller 108 transmits the requested data files accordingly.

In optional step 1040, the user may view and perform standard image operations on the disseminated small data set(s) 1002 and/or the large data set(s) 1008. If the user received the small data set(s) 1002, the user may select image product resolution and/or implement region of interest re-processing at selected resolutions, or implement region of interest re-processing of pre-defined areas at selected resolutions.

Figure 11B:
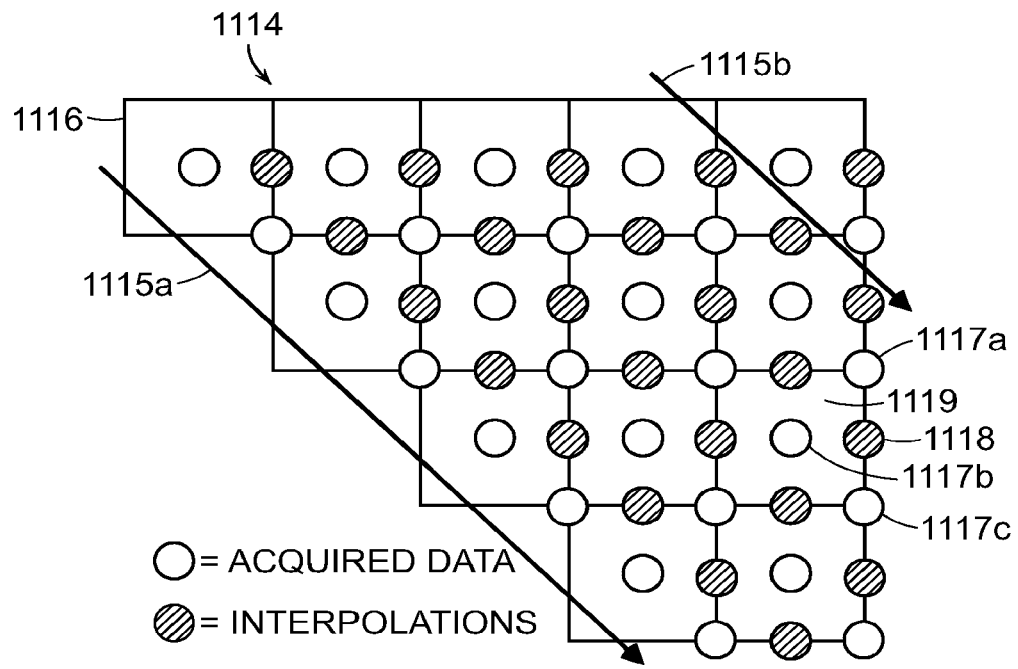
FIGS. 11B-11F are illustrations of pixel resampling grids, in accordance with some embodiments.

FIG. 11B depicts an example embodiment of a 2× resampling pixel grid 1114, in which the detector array 102 is orientated at 45° in relation to the scan geometry (indicated by directional arrows 1115A and 1115B) with a scan rate of 0.707 of PDFOV 1116 per sample time increment, as depicted by the spacing of the acquired data sample points (e.g., data samples 1117a through 1117c). The resulting effective scan width becomes 0.707 of the original array scan width. Controller 108 may evaluate interpolations (e.g., interpolation 1118 indicated by a cross-hatched dot) utilizing adjacent acquired data values 1117a through 1117c. The 2× resampling high resolution pixel grid 1114 may be generated from 0.5 PDFOV by 0.5 PDFOV image pixels aligned to a first image line. Acquired data 1117b may be asserted at the center of a 1 P square 1119 (denoted by a white dot).

Figure 11C:
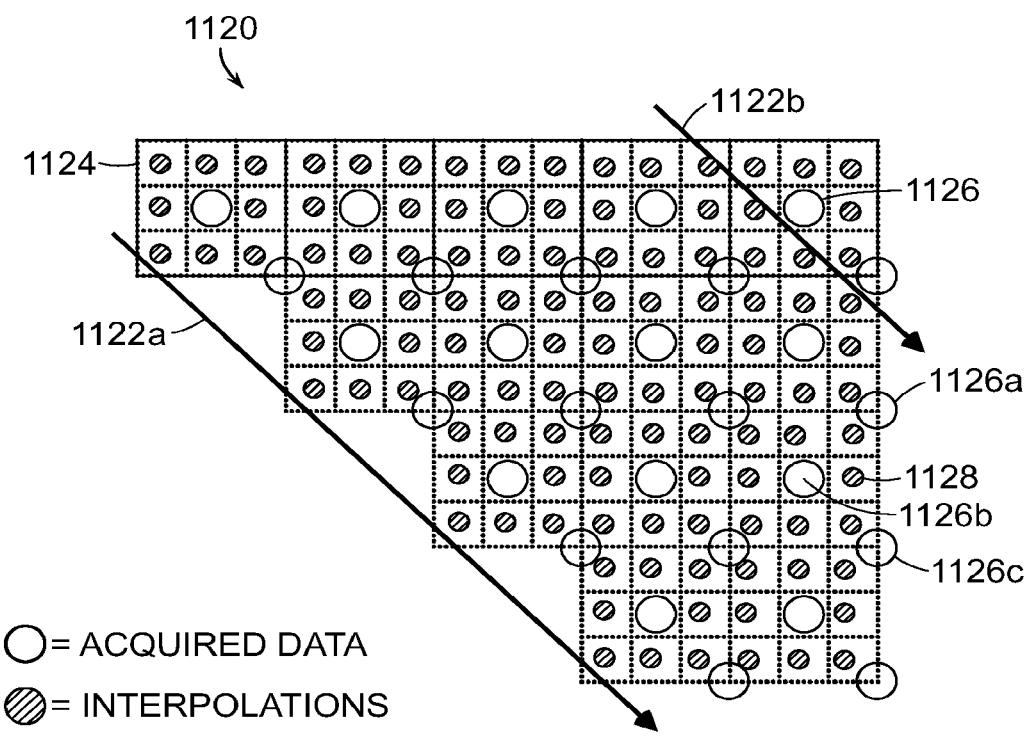

It is generally not the case that the acquired sample image data (from small set(s) 1002) will fill into a high-resolution grid at one sample per grid-point. FIG. 11C depicts another example embodiment, comprising a 3× resampling pixel grid 1120, in which the detector array 102 is orientated at 45° in relation to the scan geometry (indicated by directional arrows 1122a and 1122b) with a scan rate equal to 0.707 of PDFOV 1124, as depicted by the spacing of the acquired (small set) data sample points 1126. Controller 108 may similarly evaluate interpolations 1128 utilizing values of adjacent acquired data samples (e.g., 1126a through 1126c). The acquired data samples use the raw acquired data as it falls precisely upon a 3× image detector 104. The 3× resampling high resolution pixel grid 1120 may be generated from ⅓ PDFOV by ⅓ PDFOV image pixels aligned to a first image scan line.

Figure 11D:
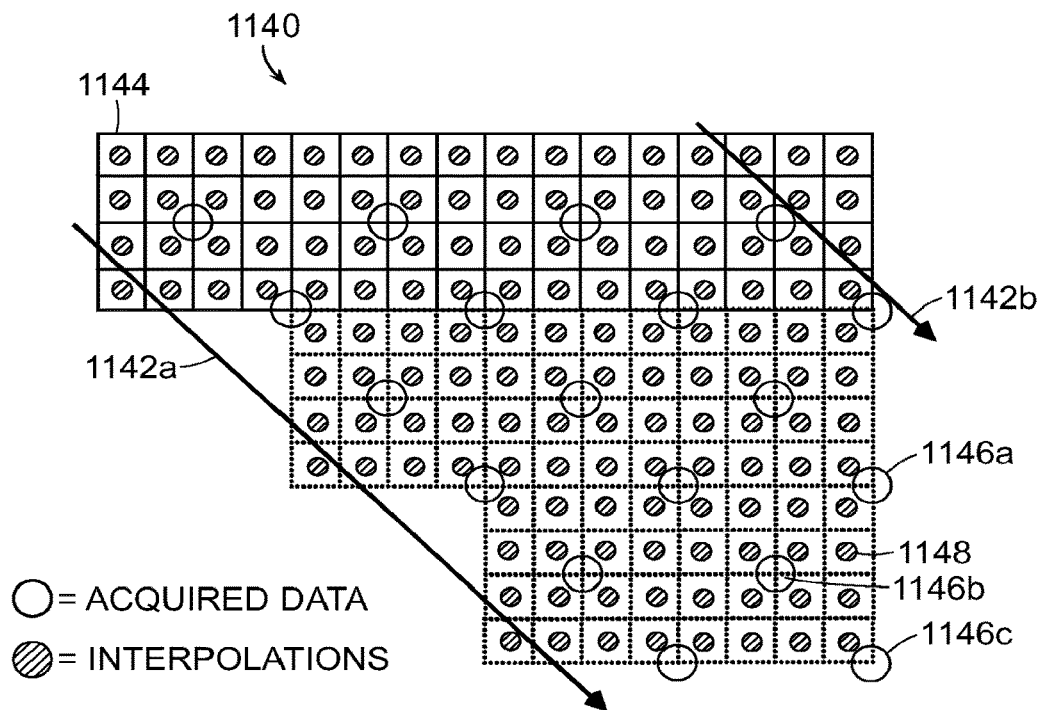

FIG. 11D depicts an additional example embodiment, this of a 4× resampling pixel grid 1140, in which the detector array 102 is orientated at 45° in relation to the scan geometry (indicated by directional arrows 1142a and 1142B) with a scan rate equal to 0.707 of PDFOV 1144, as depicted by the spacing of the acquired data sample points 1146a through 1146c. Controller 108 may similarly evaluate interpolations 1148 utilizing adjacent acquired data values 1146a, a1146b, 1146c. The 4× resampling high resolution pixel grid 1140 may be generated from ¼ PDFOV by ¼ PDFOV image pixels aligned to a first image scan line.

Figure 11E:
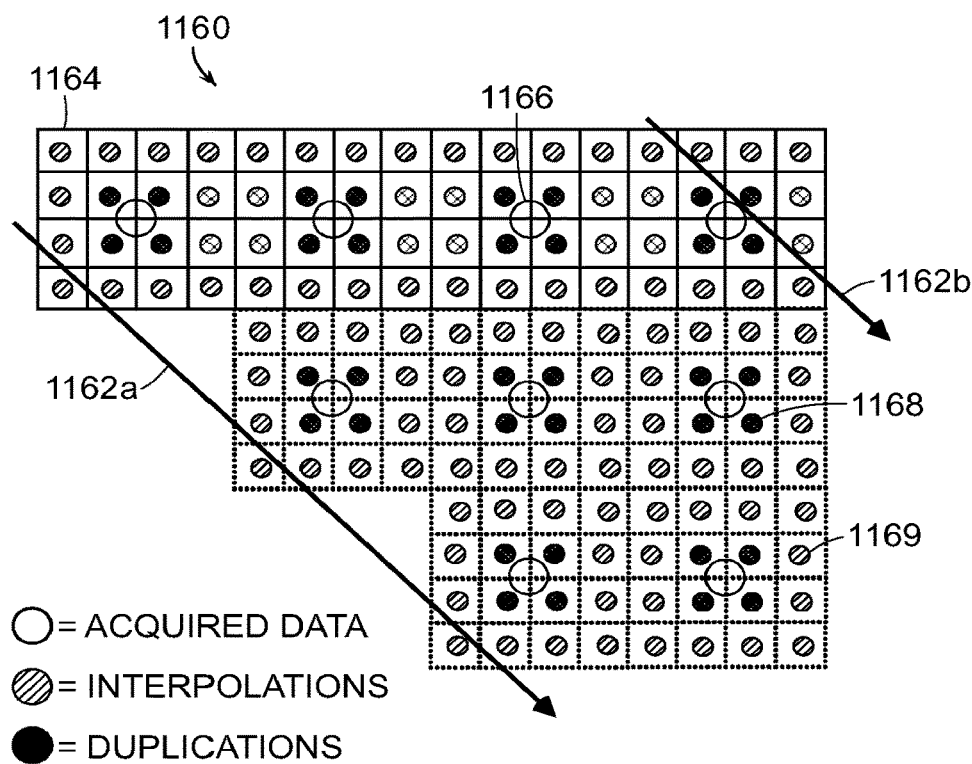
Figure 11F:
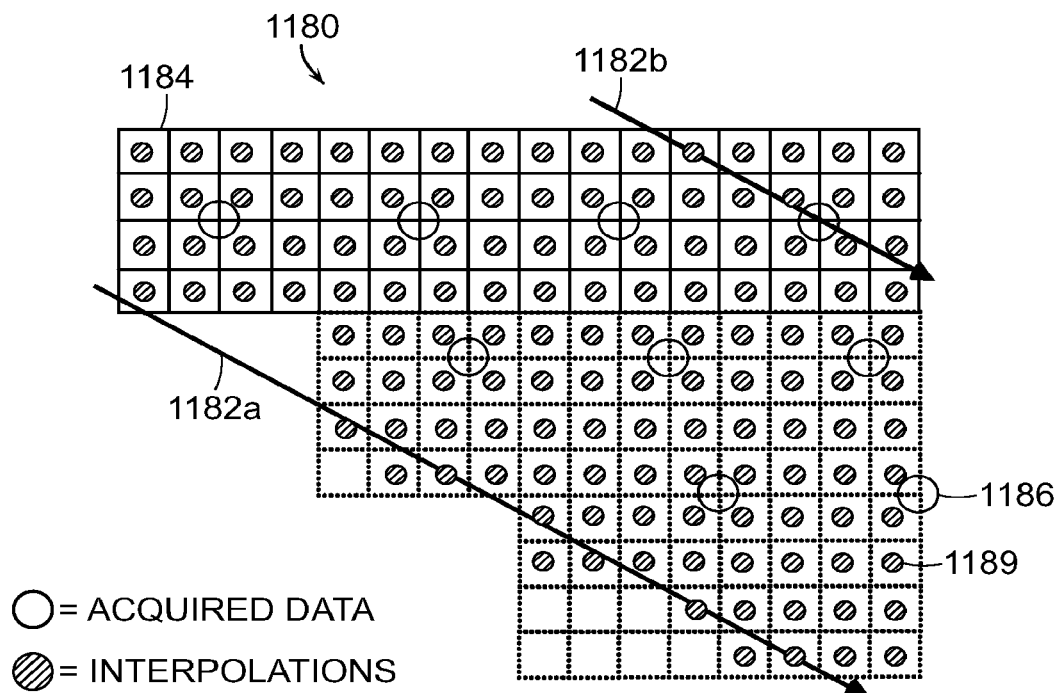

FIGS. 11E and 11F depict additional example embodiments of 4× resampling pixel grids 1160, 1180 where the detector arrays 102 are respectively orientated at 45° and at an acute angle in relation to the scan geometry (indicated respectively by directional arrows 1162a-b and 1182a-b), and with respective scan rates equal to 1.414 of PDFOV 1164 and greater than 1 PDFOV 1184, as depicted by the respective spacings of the acquired data sample points 1166 and 1186. As shown in FIG. 11E, a subset of high resolution pixels use duplicated pixels 1168 (in pixel grid 1160) that are duplicates of the acquired data 1166 that are co-aligned, and interpolations 1169 and 1189 (in both 4× resampling pixel grids 1160 and 1180). The 4× resampling high resolution pixel grids may be generated from ¼ PDFOV by ¼ PDFOV image pixels aligned to the first image line. Linear Delaunay triangulation based interpolation may be used in some embodiments.

Figure 12:
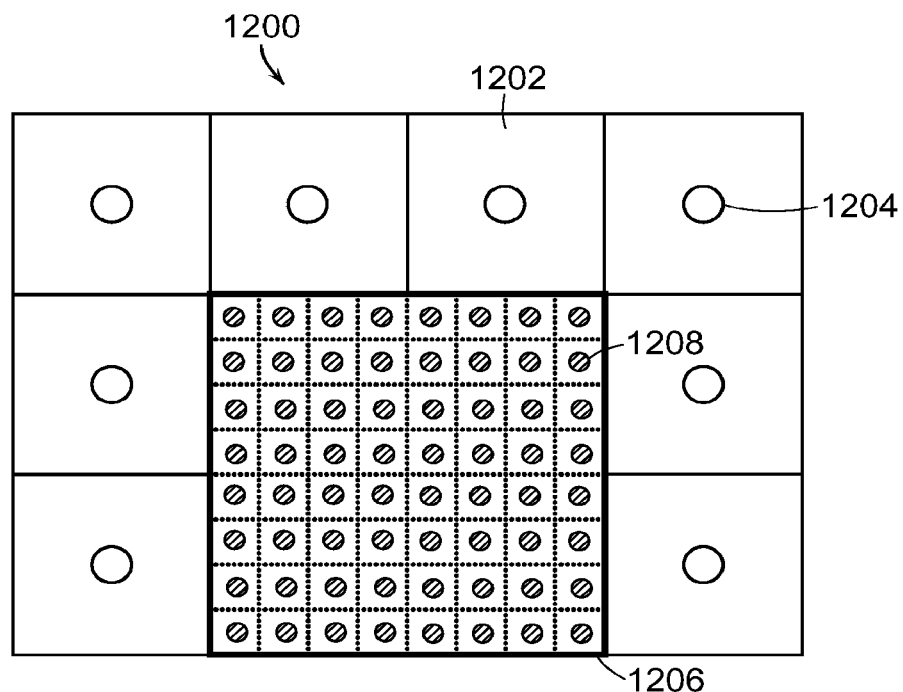
FIG. 12 is an illustration depicting a multi-resolution image display, in accordance with some embodiments.

FIG. 12 depicts an example representation of an enhanced resolution output (multi-resolution) image product 1200 including sub-regions 1202 comprising low resolution image pixels 1204 and one or more sub-regions of interest 1206 including high resolution image pixels 1208. The image resolutions may be the same or different in each sub-region of interest 1206.

Figure 13:
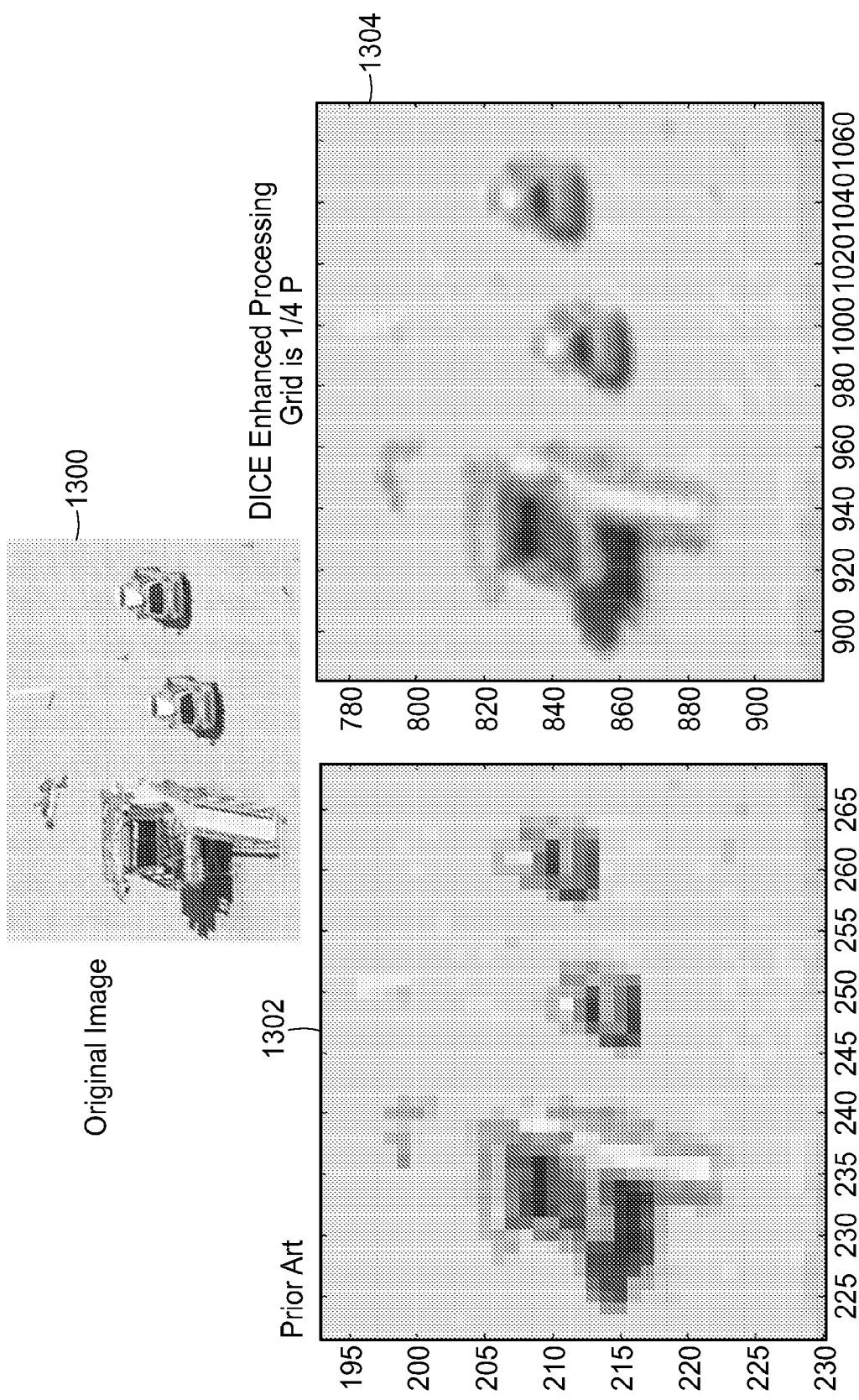
FIG. 13 are images of an original scene, the diagonally scanned scene image processed conventionally, and with DICE enhanced processing, according to some embodiments.

FIG. 13 presents example comparative imaging results for diagonal TDI scanning of an original scene 1300 using conventional techniques (image 1302) and using DICE processing (image 1304). The DICE enhanced processing parameters included use of a ¼ pixel grid (4×4 up-sampling). An improvement in resolution is clearly observable.

Simultaneous Secondary Mission Acquisition

In a secondary mission image acquisition embodiment, a super-resolution TDI imager system 100 such as described above and shown in FIGS. 1 and 2 maybe employed to construct an image of a desired image quality, additionally configured with a plurality of sensor arrays for independently adjustable scan geometry and scan rates. A capability is provided for simultaneous secondary mission acquisition during primary mission acquisition for the configurable multi-sensor platform. A configurable secondary sensor or detector array may be utilized to create the secondary sensor content by modified controller commanding. An example scan geometry configuration may include reducing the secondary detector array to a single row to achieve a sampled data set with usable content limiting non-orthogonal scan smear, wherein the sampled data sets can be produced for any scan angle and scan rate less than or equal to 0.5 PDFOV per line rate sample.

Figure 14A:
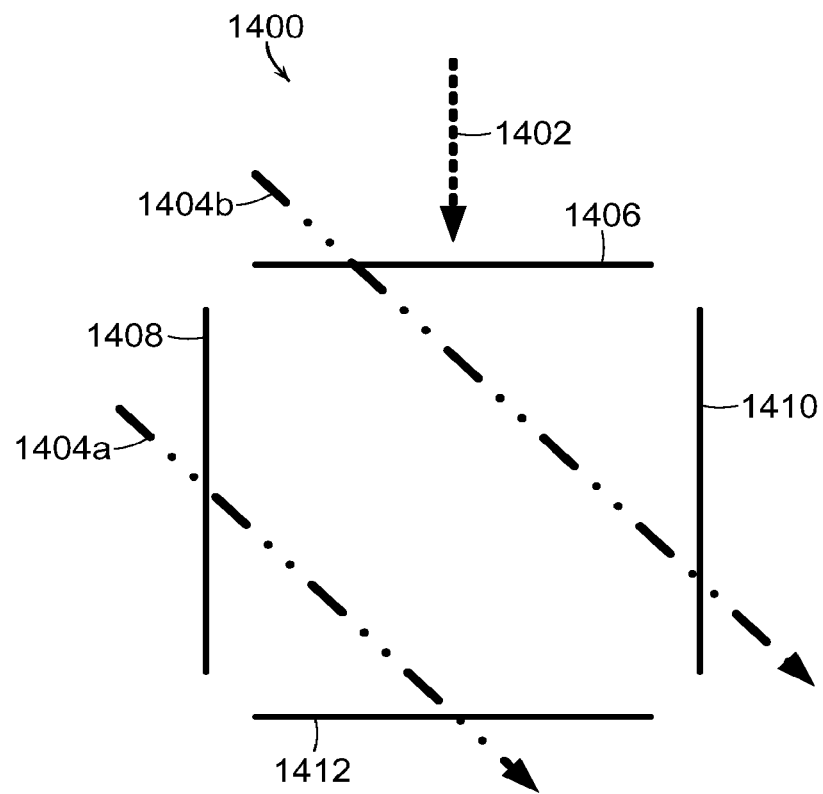
FIGS. 14A and 14B are illustrations showing, respectively, a four-sensor system scanned in a normal and at an angle, and a three-sensor system scanned with one sensor normal and two sensors at angles, in accordance with some embodiments.

FIG. 14A shows an exemplary four-sensor multi-mission system 1400 scanned in a normal scan direction 1402 and at an angle scan vectors 1404a and 1404b. Sensors 1406, 1408 and 1410 may or may not comprise configurable TDI unit cell arrays, but sensor 1412 comprises a configurable TDI unit cell array (e.g., configurable to a single row and having selective accumulation capability implemented to produce variable smear detector samples) such as described above. In this embodiment, sensor 1412 comprises the configurable secondary sensor, arranged non-parallel to a primary sensor array (sensor 1408 or 1410). As previously described, each of the unit cells of sensor 1412 are adapted to store charge based on detected photons, and are individually addressable by a controller configurable to operate in accumulate and shift modes. Sensor 1412 also includes a digital memory structure having a plurality of storage locations 120, with functionality and purpose similar to those described above, where each storage location 120 is associated with one of the unit cells 106.

While one of the primary sensors 1408 or 1410 acquires primary mission image data for a scene 112, sensor 1412 simultaneously may acquire secondary mission image data for the scene 112 scanning on a non-interference basis at various scan angles and scan rates with the primary sensor array's image acquisition. Sensor 1412 non-orthogonally scans the scene 112, during each sampling period, according to a diagonal scan geometry and in either an accumulate mode or a shift mode. During accumulate mode, for at least one of the sensor 1412 TDI unit cells 106 in the diagonal scan geometry, the controller 108 determines a digital value based on stored charge associated with the PDFOV, and adds the determined digital value to the corresponding storage location 120. During the shift mode, for at least one of the sensor 1412 TDI unit cells 106 in the diagonal scan geometry, the controller 108 determines a digital value based on stored charge associated with the PDFOV of the scene 112, adds the determined digital value to the corresponding storage location 120, and shifts stored summed digital values between adjacent corresponding storage locations 120. Sensor 1412 also generates secondary image pixels for the scene 112 from the summed digital values of a set of the corresponding storage locations 120. The smear reduction and resampling techniques described above may additionally be utilized in the multi-mission embodiments. Since a final high resolution image may be 16× as large as the original raw image data set, the option to disseminate to users the small data set(s) such as discussed above may also prove useful in the multi-mission application. Users may remotely create any of the image resolution output products from the small data sets.

The angled scan indicated by scan vectors 1404a and 1404b may be adjusted in scan angle and scan rate relative to sensor 1412 in order to achieve desired image quality independent of other sensors. Sensor 1406 may be scanned at any of its normal rates using normal scan (indicated by directional arrow 1402) while sensor 1412 is configured selectively for image quality purposes and both sensors acquire data simultaneously. In some embodiments, sensors 1406, 1408 or 1410 may be configured selectively, if available, for using angled scan vectors 1404a and 1404b while sensor 1412 is configured selectively for image quality purposes and a plurality of the sensors acquire scene image data simultaneously. In various embodiments including capabilities similar to those described above, sensor 1412 may include a controller that selects the sampling rate for sensor 1412 based on changes in relative position between the PDFOV and the scene 112 due to a slew rate and geometry of the primary sensor 1406, 1408 or 1410. The diagonal scan geometry of sensor 1412 may be configured to be a single row of the TDI unit cells 106 of sensor 1412 in an angled orientation relative to direction of scene motion.

Figure 14B:
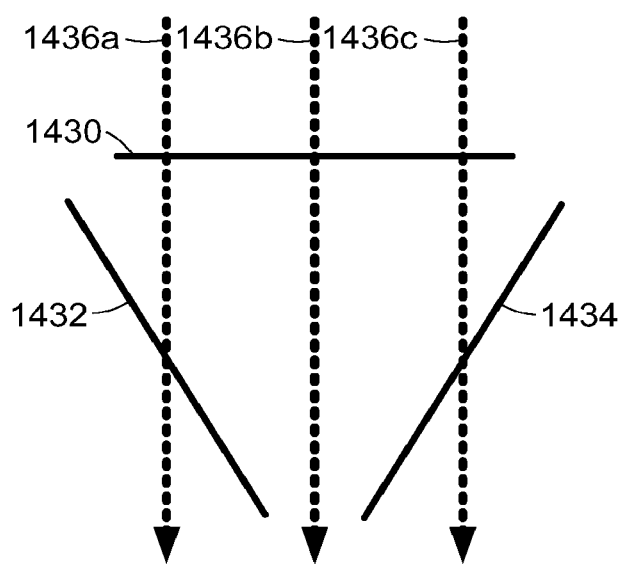

FIG. 14B illustrates an example embodiment of a three-sensor 1430, 1432, 1434 multi-mission system 1400 scanned in a normal to sensor 1430. In this embodiment, each of sensors 1430, 1432 may or may not comprise configurable TDI unit cell array 102, whereas sensor 1434 is a configurable TDI unit cell array 102. The normal scan direction to sensor 1430 is depicted by directional arrows 1436a, 1436b, and 1436c. Sensor 1430 may be scanned at any of its normal scan rates, while sensor 1434 is configured selectively for image quality purposes, and both sensors 1430, 1434 may acquire data simultaneously. Sensor 1432 may be configured selectively, if available, for image quality purposes, and all three sensors acquire data simultaneously. Sensor 1434 may be configured selectively for a normal acquisition.

Figure 15:
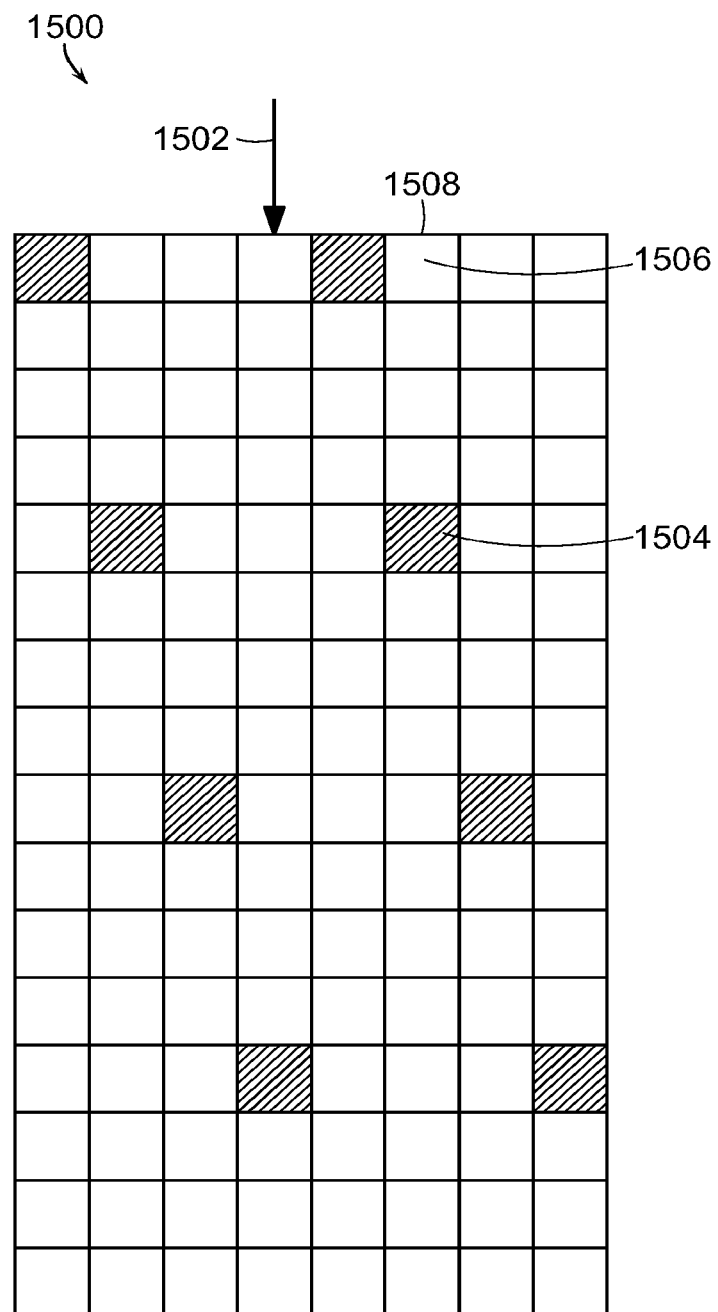
FIG. 15 is an illustration of a sparse enabled configurable TDI array, in accordance with some embodiments.

The detector array of sensor 1432 may be configured into a sparse pattern of active detectors, so that image data sets can be produced for a normal scan angle and a selected scan rate slower or faster than a PDFOV per line rate sample. For any scan rate, the controller 108 can smear any number of PDFOVs in the creation of an image data set. The sparse pattern for high scan rates enables sparse sampling to reduce total number of data samples, while maintaining a balance between in-scan and cross-scan MTF. FIG. 15 depicts an example embodiment of a sparse enabled configurable TDI unit cell array 1500, wherein a normal scan vector 1502 is utilized for image generation at a 4×PDFOV scan rate. In this example, only one sample (acquired by active detector 1504) in each four sampling periods is accumulated and shifted, and with a multitude of disabled detectors 1506 per TDI scan column 1508. The reduced sampling decreases the array output data rate, as discussed above.

Figure 16:
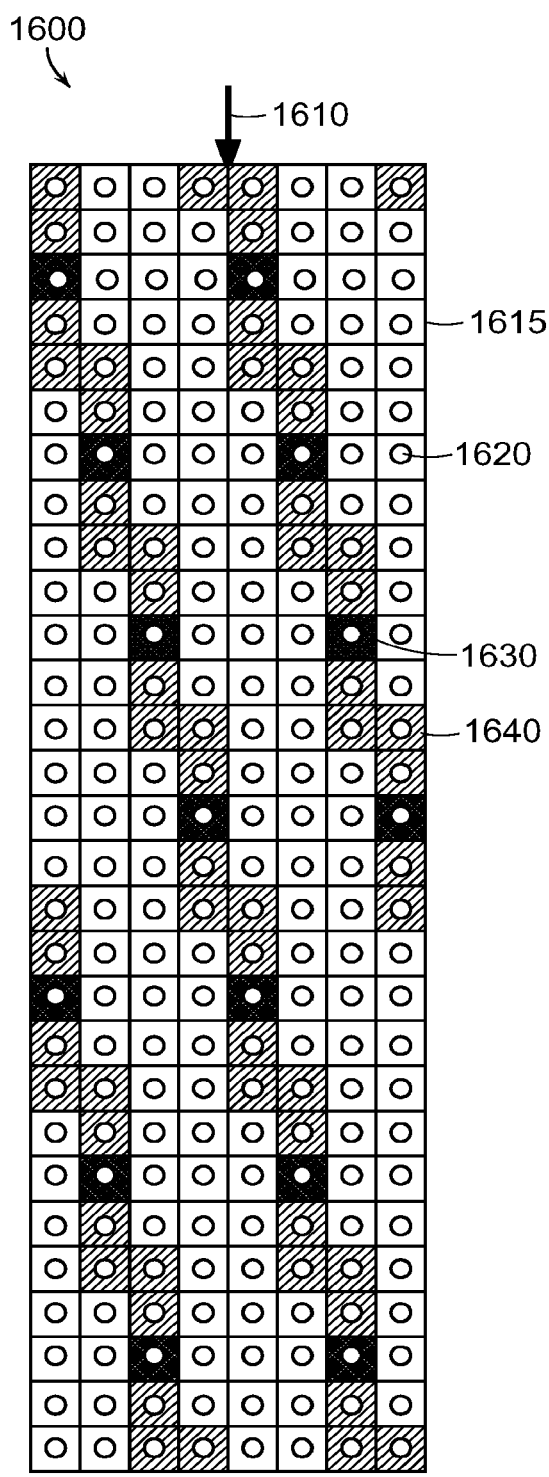
FIG. 16 is an illustration of a pixel grid for a sparse enabled configurable TDI array for a normal scan angle and a sub-sampling for a 4×PDFOV scan rate, in accordance with some embodiments.

FIG. 16 depicts an example embodiment of a sparse array interpolated image 1600 projected on ground over time (i.e., white blocks 1620 representing non collected PDFOV; sampling four locations) for sparse enabled configurable TDI unit cell array sensor 1432, where a normal scan vector 1610 is utilized for image creation at a 4×PDFOV scan rate. In this embodiment, only one sample of each four sample periods is being accumulated and shifted of the PDFOV 1615, yielding a centroid of the secondary sensor scanned detector based upon a scanned detector region of integration 1640 set with a final image being constituted of interpolated image pixels 1630 (the pixel smear sample centroid).

Figure 17:
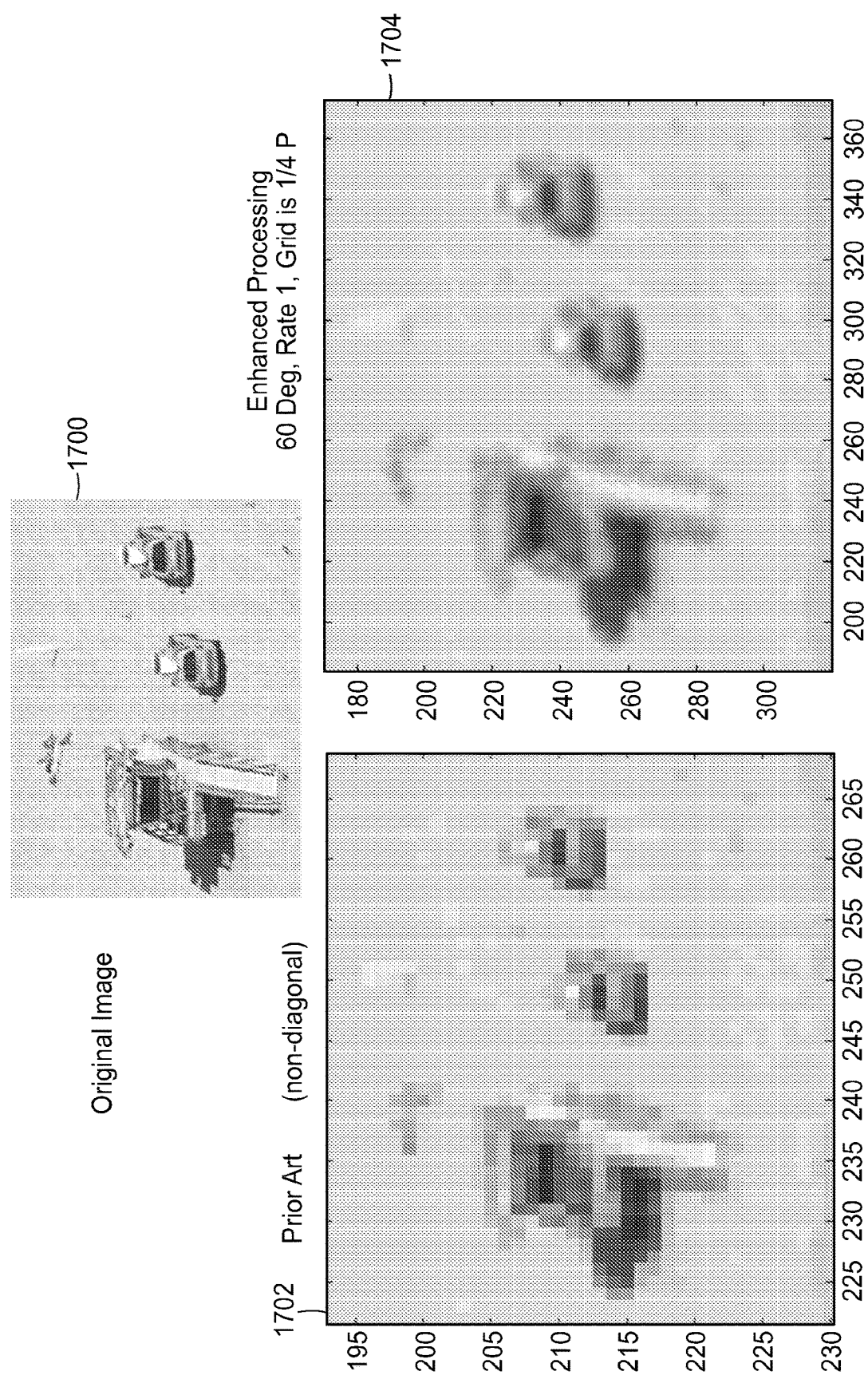
FIG. 17 are images of an original scene, the scanned scene image processed conventionally, and in accordance with some embodiments of a secondary mission image acquisition and processing method.

The multi-mission embodiments overcome the limitations of conventional field offset, non-parallel multi-sensor platforms that acquire only a single sensor's data per collect, as the other TDI array sensors are limited to orthogonal scanning, and thus can obtain no usable imagery from conventional secondary sensors in pre-existing operating modes. FIG. 17 presents images resulting from a multi-mission imaging experiment wherein test system parameters included: a line scan rate of 1000 lines/second; an integration fraction of 88%; a readout rate of 1000 lines/second; pixel spacing of 1.0 pitch cross and in-scan; an effective array scan angle of 60° from orthogonal at 1 pixel slew rate (secondary sensor rotated 120° from the primary sensor); and a smear of 1.88 pixels of a rotated detector (i.e., 1 P+P*88% integration fraction). Image 1700 comprises the original scene image, image 1702 the conventionally processed (non-simultaneously acquired image), and image 1704 the multi-mission simultaneously acquired super-resolution image, resampled to a 4× high resolution pixel grid.

Whereas many alterations and modifications of the disclosure will no doubt become apparent to a person of ordinary skill in the art after having read the foregoing description, it is to be understood that the particular embodiments shown and described by way of illustration are in no way intended to be considered limiting. No element, act, or instruction used herein should be construed as critical or essential unless explicitly described as such. Where only one item is intended, the term "one" or similar language is used. Also, as used herein, the terms "has", "have", "having", or the like are intended to be open-ended terms. Further, the phrase "based on" is intended to mean "based, at least in part, on" unless explicitly stated otherwise.

What is claimed is:

1. A method of generating image data for a scene with an imaging device including an array of time delay and integrate (TDI) unit cells each configured to store charge and generate an associated digital value based on photons detected by an associated projected detector, a controller configured to operate in a shift mode, and a digital memory structure having a plurality of storage locations, each storage location to store one of the digital values and being individually addressable by the controller, each of the unit cells being associated with a corresponding one of the storage locations, wherein the method comprises the steps performed by the controller of:

selecting a diagonal scan geometry including a set of unit cells selected from a single row of the TDI array in an angled orientation relative to changes in relative position between a projected detector field of view (PDFOV) and the scene; and scanning, during at least one sampling period, the diagonal scan geometry in a shift mode;

wherein, during the shift mode, for each of the unit cells in the diagonal scan geometry, the controller determines a digital value based on stored charge associated with the PDFOV of the scene, adds the determined digital value to the corresponding storage location, shifts stored summed digital values between adjacent corresponding storage locations, and generates image pixels for the scene from the summed digital values of a set of the corresponding storage locations.

2. The method of claim 1, wherein:

the controller is further configured to operate in an accumulate mode during which, for each of the unit cells in the diagonal scan geometry, the controller determines a digital value based on stored charge associated with the PDFOV, and adds the determined digital value to the corresponding storage location; and scanning further comprises scanning the diagonal scan geometry in the accumulate mode during at least one sampling period when the shift mode is disabled.

3. The method of claim 1, wherein the data shift of the summed digital values is selected to maximize signal range of the TDI array.

4. The method of claim 1, further comprising selecting a scan rate for the diagonal scan geometry.

5. The method of claim 1, further comprising constructing an image of the scene comprising selected effective resolution pixels by up-sampling of an even or odd multiple of the detector data with the image pixels centered or decentered from the detector data.

6. The method of claim 1, further comprising constructing an image of the scene including sub-regions having distinct effective resolutions.

7. The method of claim 6, further comprising receiving an input selection of at least one sub-region of interest where a high resolution grid pixel interpolation is to be performed.

8. The method of claim 1, further comprising:

forming an image of the scene with the image pixels;

formatting image data of the image into a spatially adjusted data representation based on the scan geometry and sampling rate;

processing with a pixel grid the spatially adjusted data representation to obtain selective resolution image pixels and an associated geometric dataset; and disseminating at least one of the image and associated scan geometry, or the selective resolution image pixels and associated geometric dataset, permitting production of dynamic images having user-selectable pixel resolution in one or more image regions of interest.

9. A line scanning imaging device for imaging a scene, the device having a readout rate that is greater than a line rate, comprising:

an array of unit cells each configured to store charge and generate an associated digital value based on photons detected by an associated projected detector;

a digital memory structure having a plurality of storage locations, each associated with a corresponding unit cell and configured to store one of the digital values and to be individually addressable; and a controller configured to:

select a diagonal scan geometry including a set of unit cells selected from a single row of the array in an angled orientation relative to changes in relative position between a projected detector field of view (PDFOV) and the scene;

scan, during at least one sampling period, the diagonal scan geometry in a shift mode, wherein, during the shift mode, for each of the unit cells in the diagonal scan geometry, the controller determines a digital value based on stored charge associated with the PDFOV of the scene, adds the determined digital value to the corresponding storage location, and shifts stored summed digital values between adjacent corresponding storage locations; and generate image pixels for the scene from the summed digital values of a set of the corresponding storage locations.

10. The line scanning imaging device of claim 9, wherein the controller is further configured to operate in an accumulate mode in at least one sampling period when the shift mode is disabled, during which, for each of the unit cells in the diagonal scan geometry, the controller determines a digital value based on stored charge associated with the PDFOV, and adds the determined digital value to the corresponding storage location.

11. The line scanning imaging device of claim 9, wherein the shift of the summed digital values is selected to maximize signal range of the time delay and integrate (TDI) array.

12. The line scanning imaging device of claim 9, wherein the controller is further configured to select a scan rate for the diagonal scan geometry.

13. The line scanning imaging device of claim 9, wherein the controller is further configured to construct an image of the scene comprising selected effective resolution pixels by up-sampling of an even or odd multiple of the detector data with the image pixels centered or decentered from the detector data.

14. The line scanning imaging device of claim 9, wherein the controller is further configured to receive an input selection of at least one sub-region of interest, and to perform high resolution grid pixel interpolation for the image sub-region.

15. The line scanning imaging device of claim 9, wherein the controller is further configured to:

form an image of the scene with the image pixels;

format image data of the image into a spatially adjusted data representation based on the scan geometry and sampling rate;

process with a pixel grid the spatially adjusted data representation to obtain selective resolution image pixels and an associated geometric dataset; and disseminate at least one of the image and associated scan geometry, or the selective resolution image pixels and associated geometric dataset, thereby permitting production of dynamic images having user-selectable pixel resolution in one or more image regions of interest.

16. The line scanning imaging device of claim 9, wherein the projected detector is responsive to visible and infrared radiation.

17. The line scanning imaging device of claim 9, wherein the array comprises a charge-coupled device (CCD) array.

* * * * *